US012233652B2

(12) United States Patent
Haga et al.

(10) Patent No.: US 12,233,652 B2
(45) Date of Patent: Feb. 25, 2025

(54) TANK UNIT AND LIQUID EJECTING APPARATUS

(71) Applicant: SEIKO EPSON CORPORATION, Tokyo (JP)

(72) Inventors: Nanami Haga, Shiojiri (JP); Yuta Komatsu, Shiojiri (JP); Akihiko Maruyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 18/046,001

(22) Filed: Oct. 12, 2022

(65) Prior Publication Data

US 2023/0117107 A1 Apr. 20, 2023

(30) Foreign Application Priority Data

Oct. 15, 2021 (JP) ................................ 2021-169380

(51) Int. Cl.
*B41J 2/175* (2006.01)
*B41J 2/18* (2006.01)

(52) U.S. Cl.
CPC ........... *B41J 2/17566* (2013.01); *B41J 2/175* (2013.01); *B41J 2/18* (2013.01); *B41J 2/17513* (2013.01); *B41J 2/17553* (2013.01); *B41J 2/17556* (2013.01); *B41J 2/17563* (2013.01)

(58) Field of Classification Search
CPC . B41J 2/17566; B41J 2/175; B41J 2/18; B41J 2/17513; B41J 2/17553; B41J 2/17556; B41J 2/17563
See application file for complete search history.

(56) References Cited

U.S. PATENT DOCUMENTS

| | | | | |
|---|---|---|---|---|
| 5,485,187 | A | 1/1996 | Okamura et al. | |
| 6,799,820 | B1 * | 10/2004 | Usui | G01F 23/2967 347/7 |
| 7,905,583 | B2 * | 3/2011 | Inoue | B41J 2/17556 347/84 |
| 10,974,517 | B2 * | 4/2021 | Escudero Gonzalez | B41J 2/195 |

FOREIGN PATENT DOCUMENTS

| | | |
|---|---|---|
| EP | 1287999 | 3/2003 |
| EP | 1356946 | 10/2003 |
| JP | S61-252980 A | 11/1986 |
| JP | H05-092578 A | 4/1993 |
| JP | 2014-151512 | 8/2014 |
| JP | 2020-082536 A | 6/2020 |

* cited by examiner

*Primary Examiner* — Geoffrey S Mruk
(74) *Attorney, Agent, or Firm* — WORKMAN NYDEGGER

(57) ABSTRACT

A tank unit includes a first inlet portion via which liquid supplied from a liquid container flows in, a first chamber configured to store the liquid that flows in via the first inlet portion, a first opening-to-atmosphere portion configured to open an inside of the first chamber to atmosphere, an outlet flow passage to which one end is connected to the first chamber, a second chamber connected to the other end of the outlet flow passage and configured to store the liquid supplied from the first chamber, a second opening-to-atmosphere portion configured to open an inside of the second chamber to atmosphere, and an on-off valve configured to open and close the outlet flow passage. The first inlet portion is connected to the first chamber via an opening portion at some midpoint in a vertical direction of the first chamber.

14 Claims, 14 Drawing Sheets

TANK UNIT AND LIQUID EJECTING APPARATUS

The present application is based on, and claims priority from JP Application Serial Number 2021-169380, filed Oct. 15, 2021, the disclosure of which is hereby incorporated by reference herein in its entirety.

BACKGROUND

1. Technical Field

Embodiments of the present disclosure relate to a tank unit configured to contain liquid and a liquid ejecting apparatus equipped therewith.

2. Related Art

JP-A-2020-082536 discloses an ink-jet printer as an example of a liquid ejecting apparatus that includes a liquid ejecting head configured to eject liquid such as ink. A liquid ejecting apparatus of this kind includes a tank unit configured to store liquid. A liquid container such as a cartridge is detachably attached to the tank unit. The tank unit is configured such that liquid supplied from the liquid container flows into it and the liquid flows out of it toward a liquid ejecting head configured to eject the liquid. The liquid ejecting head ejects the liquid supplied from the tank unit.

The tank unit disclosed in JP-A-2020-082536 has two reservoir chambers. One of them is a first chamber configured to store the liquid having flowed in from the liquid container. The other is a second chamber configured to store the liquid having flowed in from the first chamber. The liquid flows from the second chamber into the liquid ejecting head. The tank unit disclosed in JP-A-2020-082536 further includes a replenishment valve, a liquid surface sensor, and a circulation pump, which are controlled by a controller.

However, in the liquid ejecting apparatus disclosed in JP-A-2020-082536, in order to adjust the liquid surface of the two reservoir chambers into an appropriate level, complex supply control by means of the replenishment valve, the liquid surface sensor, and the circulation pump is required. Therefore, a tank unit and a liquid ejecting apparatus that make it possible to adjust the liquid surface of the two reservoir chambers into an appropriate level with a simple structure have been awaited.

SUMMARY

A tank unit according to a certain aspect of the present disclosure is configured such that liquid supplied from a liquid container flows into it and the liquid flows out of it toward a liquid ejecting head configured to eject the liquid. The tank unit includes: a first inlet portion via which the liquid supplied from the liquid container flows in; a first chamber configured to store the liquid that flows in via the first inlet portion; a first opening-to-atmosphere portion configured to open an inside of the first chamber to atmosphere; an outlet flow passage to which one end is connected to the first chamber; a second chamber connected to the other end of the outlet flow passage and configured to store the liquid supplied from the first chamber; a second opening-to-atmosphere portion configured to open an inside of the second chamber to atmosphere; and an on-off valve configured to open and close the outlet flow passage, wherein the first inlet portion is connected to the first chamber via an opening portion at some midpoint in a vertical direction of the first chamber.

A liquid ejecting apparatus according to a certain aspect of the present disclosure includes a liquid ejecting head configured to eject liquid; the above tank unit; a supply flow passage that provides communication between the outlet portion and the liquid ejecting head; and a collection flow passage that provides communication between the liquid ejecting head and second inlet portion.

DESCRIPTION OF EXEMPLARY EMBODIMENTS

Figure 1:
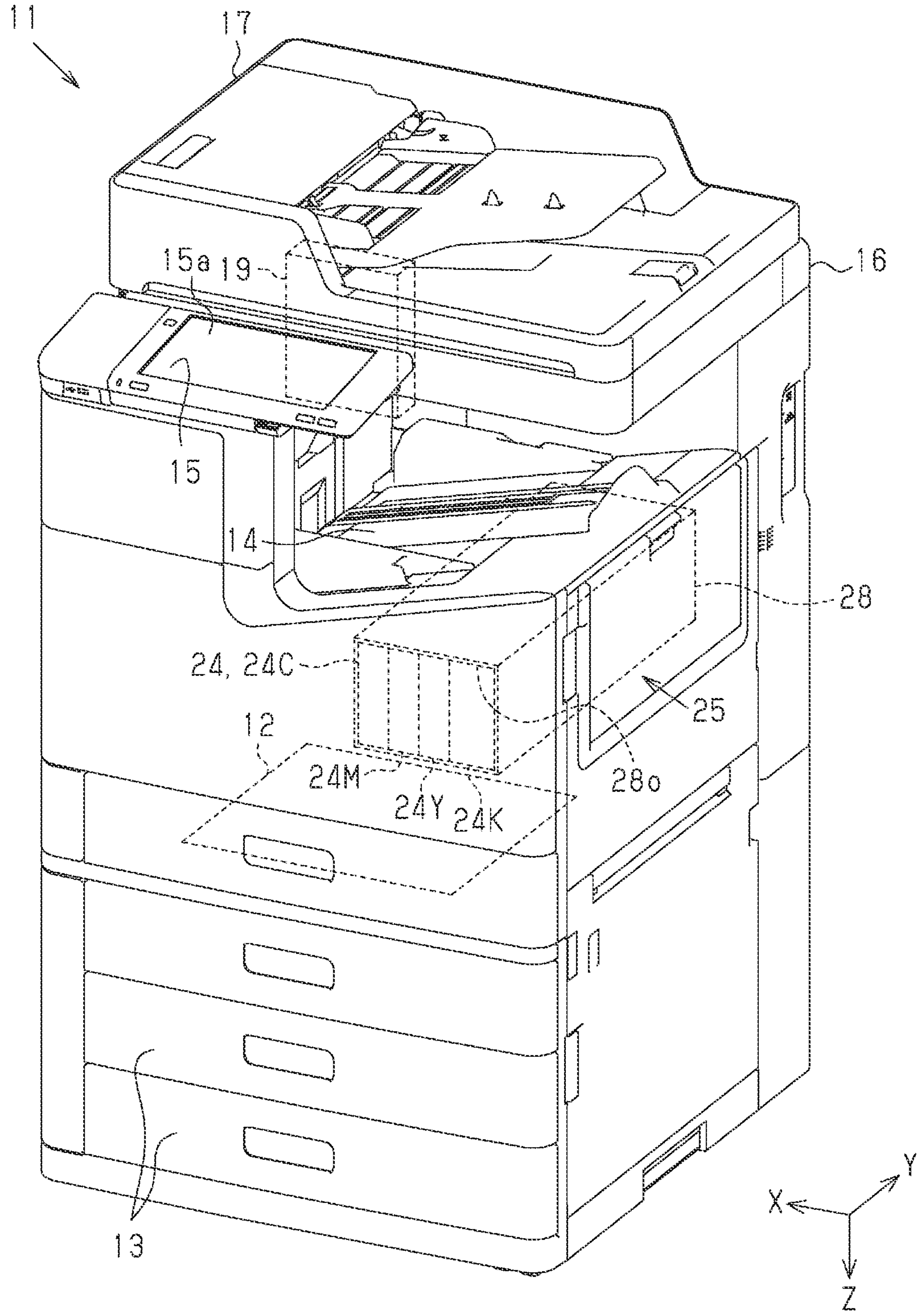
FIG. 1 is a perspective view of a liquid ejecting apparatus according to an exemplary embodiment.

With reference to the accompanying drawings, a tank unit according to some exemplary embodiments of the present disclosure, and a liquid ejecting apparatus equipped therewith, will now be explained. The liquid ejecting apparatus disclosed herein is, for example, an ink-jet printer that performs printing by ejecting ink, which is an example of liquid, onto a medium such as paper.

In the drawings, it is assumed that a liquid ejecting apparatus 11 is installed on a horizontal plane, and, based on this assumption, the direction of gravity is indicated by a Z axis, and the directions along the horizontal plane are indicated by an X axis and a Y axis. The X, Y, and Z axes are orthogonal to one another. When the user stands in front of the liquid ejecting apparatus 11 in a facing manner, the Y axis represents the direction of the depth of the liquid ejecting apparatus 11, and the X axis represents the direction of the width of the liquid ejecting apparatus 11.

Overall Structure of Liquid Ejecting Apparatus

As illustrated in FIG. 1, the liquid ejecting apparatus 11 may include a medium container portion 13, which is capable of containing a medium 12 inside, a stacker 14, which receives the medium 12 after printing, and an operation portion 15, which is used for operating the liquid ejecting apparatus 11. The operation portion 15 may be, for example, a touch panel. The operation portion 15, a touch panel, may include a display portion 15*a* capable of displaying various kinds of operation screen and various kinds of message, etc. The liquid ejecting apparatus 11 may include an image reading portion 16, which reads an image of a document, and an automatic feeding portion 17, which feeds the document to the image reading portion 16.

The liquid ejecting apparatus 11 includes a control portion 19, which controls various kinds of operation performed in the liquid ejecting apparatus 11. The control portion 19 can be configured as circuitry that includes: (1) one or more processors configured to operate in accordance with computer programs (software), (2) one or more specific-purpose hardware circuits such as specific-purpose hardware (application specific integrated circuit (ASIC)) configured to perform at least a part of various kinds of processing, or (3) a combination of them. The processor includes a CPU and a memory such as a RAM and a ROM, etc. Program codes or commands configured to cause the CPU to perform processing are stored in the memory. The "memory", namely, a computer-readable medium, encompasses every kind of available medium that is accessible by a general-purpose or specific-purpose computer.

The liquid ejecting apparatus 11 includes a tank unit 26. The tank unit 26 may include an attachment portion 28 to which one or more liquid containers 24 can be detachably attached. The attachment portion 28 may have a plurality of slots corresponding respectively to the plurality of liquid containers 24. The attachment portion 28 has an insertion opening 28*o* through which the liquid containers 24 are configured to be inserted. The insertion opening 28*o* is, for example, open at the front of the liquid ejecting apparatus 11. In this case, for example, the liquid containers 24 are configured to be inserted through the insertion opening 28*o* in the direction along the Y axis from the front of the liquid ejecting apparatus 11. The liquid ejecting apparatus 11 may include a non-illustrated cover configured to cover the insertion opening 28*o*. The cover may be movable between a position for covering the insertion opening 28*o* and a position for exposing the insertion opening 28*o*.

Plural different kinds of liquid, for example, plural kinds of ink different in color from one another, may be contained in the plurality of liquid containers 24 (24C, 24M, 24Y, and 24K) respectively. For example, cyan ink, magenta ink, yellow ink, and black ink are contained in the liquid containers 24C, 24M, 24Y, and 24K respectively. The amount of liquid contained in the plurality of liquid containers 24 may be different between any two or more of them. For example, the amount of liquid contained in the liquid container 24K, namely, black ink, may be larger than the amount of liquid contained in the liquid container 24C, 24M, 24Y. The width of the liquid container 24K, namely, its length along the X axis, may be greater than that of the liquid container 24C, 24M, 24Y. The direction in which the liquid containers 24 can be inserted into the tank unit 26 is not limited to the direction along the Y axis. It may be the direction along the X axis, the direction along the Z axis, an oblique direction intersecting with at least one of the X, Y, and Z axes at an acute angle, or the like.

Structure of Supply Unit 25

Next, with reference to FIG. 2, a structure of a supply unit 25 will now be explained.

Figure 2:
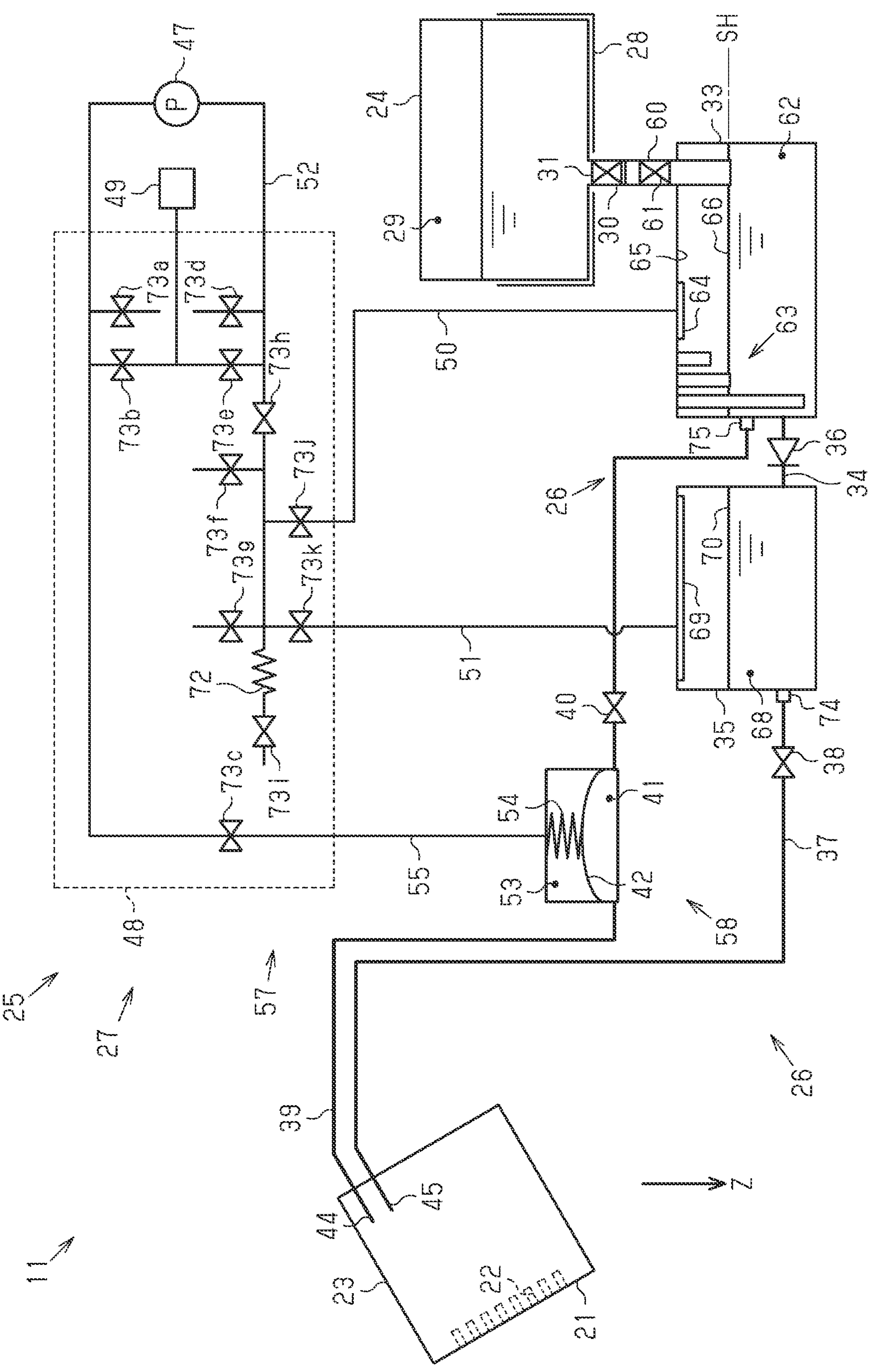
FIG. 2 is a schematic view of a supply mechanism and a drive mechanism of the liquid ejecting apparatus.

As illustrated in FIG. 2, the liquid ejecting apparatus 11 includes a liquid ejecting head 23, a supply unit 25, and a supply flow passage 37. Liquid is supplied from the supply unit 25 to the liquid ejecting head 23 through the supply flow passage 37.

The supply unit 25 includes the tank unit 26, which includes two reservoir portions 33 and 35 for storing liquid. The supply unit 25 may include a drive mechanism 27 configured to drive the tank unit 26.

The tank unit 26 is configured such that liquid supplied from the liquid container 24 flows into it and the liquid flows out of it toward the liquid ejecting head 23 configured to eject the liquid. The tank unit 26 includes a first inlet portion 60, a first reservoir portion 33, a second reservoir portion 35, and an outlet flow passage 34. The first reservoir portion 33 is in communication with the second reservoir portion 35 through the outlet flow passage 34. An on-off valve 36 is provided somewhere between the ends of the outlet flow passage 34. The first reservoir portion 33 is located upstream of the second reservoir portion 35 in the direction in which the liquid flows when supplied from the liquid container 24 toward the liquid ejecting head 23. The first reservoir portion 33 serves as a sub tank for temporarily retaining the liquid having flowed into the first reservoir portion 33 from the liquid container 24. The second reservoir portion 35 serves as a reservoir tank for temporarily retaining the liquid having flowed into the second reservoir portion 35 from the first reservoir portion 33 until the liquid is supplied to the liquid ejecting head 23.

The liquid having flowed in from the liquid container 24 that is in an attached state is stored in the first reservoir portion 33. When the liquid stored in the second reservoir portion 35 is consumed as a result of the supply of this liquid out of the second reservoir portion 35 to the liquid ejecting head 23, the on-off valve 36 opens, and replenishment liquid for making up for the consumption is supplied from the first reservoir portion 33 to the second reservoir portion 35 through the outlet flow passage 34. The on-off valve 36 may be a one-way valve. The on-off valve 36, a one-way valve, tolerates flow of the liquid from a first chamber 62 toward a second chamber 68 and does not tolerate flow of the liquid from the second chamber 68 toward the first chamber 62.

The first reservoir portion 33 includes the first chamber 62 (sub tank chamber) configured to store the liquid supplied from the liquid container 24. The second reservoir portion 35 includes the second chamber 68 (reservoir tank chamber) configured to store the liquid supplied from the first chamber 62 through the outlet flow passage 34 when the on-off valve 36 is open. The first chamber 62 is in communication with the second chamber 68 through the outlet flow passage 34. Though the above-mentioned on-off valve 36 provided on the outlet flow passage 34 may be controlled by the control portion 19, in the present embodiment, it is a differential pressure regulating valve capable of being opened and closed by a hydraulic head difference. A detailed structure of the on-off valve 36 will be explained later.

As illustrated in FIG. 2, the tank unit 26 having the above structure includes a first opening-to-atmosphere portion 64 and a second opening-to-atmosphere portion 69, in addition to the first inlet portion 60, the first chamber 62, the outlet flow passage 34, the second chamber 68, and the on-off valve 36. The first opening-to-atmosphere portion 64 is able to open the inside of the first chamber 62 to atmosphere. The first opening-to-atmosphere portion 64 is open to a space over a first liquid surface 66 indicating the level of the liquid stored in the first chamber 62. The second opening-to-atmosphere portion 69 is able to open the inside of the second chamber 68 to atmosphere. The second opening-to-atmosphere portion 69 is open to a space over a second liquid surface 70 indicating the level of the liquid stored in the second chamber 68.

The first opening-to-atmosphere portion 64 may be configured to be switchable between an open-to-atmosphere state, in which the inside of the first chamber 62 is open to atmosphere, and a non-open-to-atmosphere state, in which the inside of the first chamber 62 is not open to atmosphere. The second opening-to-atmosphere portion 69 may be configured to be switchable between an open-to-atmosphere state, in which the inside of the second chamber 68 is open to atmosphere, and a pressurized state, in which the inside of the second chamber 68 is at a pressure higher than atmospheric pressure.

The liquid ejecting apparatus 11 includes the liquid ejecting head 23, which is capable of ejecting liquid, and the supply flow passage 37 via which the tank unit 26 having the above structure is in communication with the liquid ejecting head 23. The liquid stored in the tank unit 26 is supplied to the liquid ejecting head 23 through the supply flow passage 37. The liquid ejecting head 23 ejects the liquid supplied from the tank unit 26 through the supply flow passage 37. The liquid ejecting apparatus 11 may further include a collection flow passage 39, through which the liquid ejecting head 23 is in communication with the tank unit 26. That is, the liquid ejecting apparatus 11 may include the supply flow passage 37, through which the liquid stored in the tank unit 26 is supplied to the liquid ejecting head 23, and the collection flow passage 39, through which the liquid is collected from the liquid ejecting head 23 to the tank unit 26. As described here, the liquid ejecting apparatus 11 may be configured to circulate the liquid between the tank unit 26 and the liquid ejecting head 23 through the supply flow passage 37 and the collection flow passage 39.

For example, liquid heated using a non-illustrated heater may be circulated between the tank unit 26 and the liquid ejecting head 23 so that the liquid ejecting apparatus 11 will be able to eject the liquid having a predetermined temperature from the liquid ejecting head 23. As another example, when the liquid is pigment-based ink, by circulating the liquid between the tank unit 26 and the liquid ejecting head 23, the liquid ejecting apparatus 11 may be configured to eject the liquid containing pigments dispersed uniformly therein from the liquid ejecting head 23, while suppressing the precipitation of the pigments in the liquid by utilizing stirring effects produced by the circulation of the liquid. Of course, the liquid may be circulated between the tank unit 26 and the liquid ejecting head 23 for any other purpose.

The liquid ejecting apparatus 11 may include the liquid ejecting head 23, the tank unit 26, the supply flow passage 37, a second inlet portion 75, and the collection flow passage 39. The tank unit 26 may include an outlet portion 74, via which the liquid contained inside flows out toward the liquid ejecting head 23 through the supply flow passage 37, and the second inlet portion 75, via which the liquid collected from the liquid ejecting head 23 through the collection flow passage 39 flows in. The supply flow passage 37 provides communication between the outlet portion 74 and the liquid ejecting head 23. The collection flow passage 39 provides communication between the liquid ejecting head 23 and the second inlet portion 75.

As illustrated in FIG. 2, when a liquid circulation system is adopted in the liquid ejecting apparatus 11, the liquid stored in the second chamber 68 may flow through the supply flow passage 37 to the liquid ejecting head 23, and the liquid returning from the liquid ejecting head 23 may flow through the collection flow passage 39 to the first chamber 62. In this case, the outlet portion 74 may be provided on the second reservoir portion 35, and the second inlet portion 75 may be provided on the first reservoir portion 33 (see FIGS. 8 and 10).

The liquid ejecting head 23 has one or more nozzles 22 and a nozzle surface 21, in which these nozzles 22 are formed. The tank unit 26 is configured to supply the liquid contained in the liquid container 24 to the liquid ejecting head 23 through the first reservoir portion 33, the outlet flow passage 34, the second reservoir portion 35, and the supply flow passage 37. The liquid ejecting head 23 is configured to eject the supplied liquid from the nozzles 22.

The liquid ejecting apparatus 11, if equipped with a plurality of supply units 25 corresponding to different colors, is able to perform color printing by ejecting ink of the plurality of colors. A single drive mechanism 27 may drive a plurality of tank units 26 together. The liquid ejecting apparatus 11 may include a plurality of drive mechanisms 27 configured to drive a plurality of tank units 26 individually.

The liquid ejecting head 23 may be detachably attached to the body of the liquid ejecting apparatus 11. The liquid ejecting head 23 may be in a tilted position such that its nozzle surface 21 is inclined with respect to a horizontal plane. The liquid ejecting head 23 may, in a tilted position, perform printing by ejecting liquid toward the medium 12. The liquid ejecting head 23 may be a line-type head oriented in the direction of the width of the medium 12. The liquid ejecting head 23 may be a serial-type head configured to perform printing while moving in the direction of the width of the medium 12.

The liquid container 24 may have a containing chamber 29 that contains liquid. The liquid contained in the containing chamber 29 flows out via a pouring outlet portion 30. The pouring outlet portion 30 may include an outlet valve 31. The containing chamber 29 is, for example, a hermetically-closed space that is not in communication with atmosphere. The liquid container 24 before being attached to the attachment portion 28 may contain a larger amount of liquid than an amount of liquid that can be stored in the tank unit 26.

The supply unit 25 may include a supply valve 38, which can close the supply flow passage 37, the collection flow passage 39, a circulation valve 40, which can open and close the collection flow passage 39, and a liquid chamber 41. The liquid chamber 41 is located somewhere between the ends of the collection flow passage 39. The collection flow passage 39 has, as the ends, an upstream end connected to the liquid ejecting head 23 and a downstream end connected to the first reservoir portion 33. The collection flow passage 39 is a flow passage through which the liquid present inside the liquid ejecting head 23 flows toward the tank unit 26. The term "connected" as used herein shall be construed to encompass not only "directly connected", "directly in (fluid) communication with" but also "indirectly connected", "indirectly in (fluid) communication with".

The liquid chamber 41 is located on the collection flow passage 39, specifically, between the liquid ejecting head 23 and the circulation valve 40. A part of the liquid chamber 41 is formed by a flexible member 42. Elastic deformation of the flexible member 42 causes a change in the capacity of the liquid chamber 41.

The liquid ejecting head 23 may include a first connection portion 44, to which the collection flow passage 39 is connected, and a second connection portion 45, to which the supply flow passage 37 is connected. The collection flow passage 39 has the upstream end connected to the first connection portion 44 and the downstream end connected to the first reservoir portion 33. The supply flow passage 37 has an upstream end connected to the second reservoir portion 35 and a downstream end connected to the second connection portion 45. The first connection portion 44 may be located at a position above the second connection portion 45 when the liquid ejecting head 23 is in a tilted position.

As illustrated in FIG. 2, the liquid ejecting apparatus 11 may further include a pressurizing portion 47. The pressurizing portion 47 may be in communication with the second opening-to-atmosphere portion 69 and be configured to apply pressure to the inside of the second chamber 68. That is, the drive mechanism 27 may include the pressurizing portion 47 configured to apply pressure to the inside of the second reservoir portion 35. The drive mechanism 27 may include a switching mechanism 48, which is connected to the pressurizing portion 47, and a pressure sensor 49, which is configured to detect pressure. The drive mechanism 27 may include an opening-to-atmosphere path 50, which is connected to the first reservoir portion 33, a pressurizing flow passage 51, which is connected to the second chamber 68, and a connection flow passage 52, which connects the opening-to-atmosphere path 50 and the pressurizing flow passage 51 to the pressurizing portion 47. The drive mechanism 27 may include an air chamber 53, which is partitioned off from the liquid chamber 41 by the flexible member 42 provided therebetween, a spring 54, which is provided inside the air chamber 53, and an air flow passage 55, which is connected to the air chamber 53. By pushing the flexible member 42, the spring 54 reduces changes in pressure of the liquid inside the collection flow passage 39 and the liquid ejecting head 23.

The pressurizing portion 47 is, for example, a tube pump that includes rollers and a tube. In this case, the tube pump sends air by causing its rollers to rotate while squeezing the tube by the rollers. The non-illustrated tube of the pressurizing portion 471 has a first end connected to the air flow passage 55 and a second end connected to the connection flow passage 52. The pressurizing portion 47, when driven in a forward direction, sends air taken in from the air flow passage 55 into the connection flow passage 52. The pressurizing portion 47, when driven in a reverse direction, sends air taken in from the connection flow passage 52 into the air flow passage 55.

The supply unit 25 may include a pressurizing mechanism 57 configured to apply pressure to the liquid present inside the supply flow passage 37. The pressurizing mechanism 57 includes the pressurizing portion 47, the air chamber 53, and the air flow passage 55. The supply unit 25 may include a fine pressurizing portion 58 located on the collection flow passage 39 between the liquid ejecting head 23 and the circulation valve 40. The fine pressurizing portion 58 includes the pressurizing mechanism 57 and the liquid chamber 41. The fine pressurizing portion 58 is configured to apply pressure to the liquid present inside the collection flow passage 39. More particularly, the pressurizing mechanism 57 pressurizes the flexible member 42 from the outside of the liquid chamber 41.

Structure of First Reservoir Portion 33

Next, the first reservoir portion 33 will now be explained. The first reservoir portion 33 may include the first inlet portion 60, the first chamber 62, a liquid surface detecting portion 63, and the first opening-to-atmosphere portion 64 The first inlet portion 60 may include an inlet valve 61.

When the liquid container 24 is attached to the attachment portion 28 (see FIG. 1) of the tank unit 26, the pouring outlet portion 30 becomes connected to the first inlet portion 60, and the outlet valve 31 and the inlet valve 61 open. The valves 31 and 61 are kept in an open state when there exists the liquid container 24 attached to the attachment portion 28. The inlet valve 61 may open earlier than the outlet valve 31 in the process of attachment of the liquid container 24 to the attachment portion 28. Opening the inlet valve 61 earlier makes the leakage of liquid from the liquid container 24 less likely to occur.

Liquid supplied from the liquid container 24 flows in via the first inlet portion 60. The first inlet portion 60 may be located over or above the first reservoir portion 33. For example, the first inlet portion 60 may be provided through the ceiling 65 of the first chamber 62. The lower end of the first inlet portion 60 may be located inside the first chamber 62 and may be located under or below the ceiling 65. The upper end of the first inlet portion 60 may be located outside the first chamber 62 and may be located over or above the ceiling 65. An example of a detailed structure of the first inlet portion 60 and the first chamber 62 will be explained later.

The first chamber 62 stores the liquid having flowed in via the first inlet portion 60. The lower end of the first inlet portion 60 is located below the nozzle surface 21. Therefore, the first liquid surface 66 of the liquid stored in the first chamber 62 changes in level within a range below the nozzle surface 21. Specifically, due to a hydraulic head difference from the liquid stored in the first reservoir portion 33, the liquid contained in the liquid container 24 flows via the pouring outlet portion 30 and the first inlet portion 60 into the first reservoir portion 33.

The first opening-to-atmosphere portion 64 is able to open the inside of the first chamber 62 to atmosphere. The first opening-to-atmosphere portion 64 is made of, for example, a vapor-liquid separator film. The term "vapor-liquid separator film" as used herein means a film member that has a function of not allowing liquid to pass through itself and allowing air to pass through itself. The first opening-to-atmosphere portion 64 prevents the liquid stored in the first chamber 62 from leaking out and allows air to enter the first chamber 62 from the outside and to exit therefrom to the outside. Since the inside of the first chamber 62 is open to atmosphere as described above, the first liquid surface 66 changes in level due to a liquid inflow from the liquid container 24 via the first inlet portion 60 and due to a liquid outflow through the outlet flow passage 34.

One end of the outlet flow passage 34 is connected to the first chamber 62. The liquid stored in the first chamber 62 flows out through the outlet flow passage 34.

The on-off valve 36 is able to open and close the outlet flow passage 34. The on-off valve 36 may include a one-way valve that tolerates flow of the liquid from the first chamber 62 toward the second chamber 68 and does not tolerate flow of the liquid from the second chamber 68 toward the first chamber 62. A detailed structure of the on-off valve 36 will be explained later.

When the liquid contained in the liquid container 24 flows into the first reservoir portion 33 via the pouring outlet portion 30 and the first inlet portion 60, air flows from the first reservoir portion 33 into the liquid container 24 via the first inlet portion 60 and the pouring outlet portion 30, wherein an amount of the air corresponds to an amount of the liquid flowing into the first reservoir portion 33. In addition, the liquid-level position of the first liquid surface 66 rises by a level amount corresponding to the amount of the liquid flowing into the first reservoir portion 33. When the first liquid surface 66 rising in level reaches the lower end of the first inlet portion 60, the flow of the air from the first reservoir portion 33 into the liquid container 24 stops. Since the containing chamber 29 is hermetically closed, this stop of the flow of the air causes a decrease in the internal pressure of the containing chamber 29 corresponding to an amount of the liquid flowing in. Then, the flow of the liquid from the liquid container 24 into the first reservoir portion 33 stops when the negative pressure inside the containing chamber 29 becomes greater than the hydraulic head of the liquid contained in the containing chamber 29.

When liquid flows from the first reservoir portion 33 to the second reservoir portion 35, the liquid-level position of the first liquid surface 66 drops. When the first liquid surface 66 dropping in level falls below the lower end of the first inlet portion 60, air flows into the containing chamber 29 via the first inlet portion 60 and the pouring outlet portion 30, and the negative pressure inside the containing chamber 29 decreases. Then, the liquid contained in the liquid container 24 flows into the first reservoir portion 33 when the negative pressure inside the containing chamber 29 becomes less than the hydraulic head of the liquid contained in the containing chamber 29. As a result, the first liquid surface 66 is kept at a standard level position SH that is a position near the lower end of the first inlet portion 60 while the liquid is present inside the liquid container 24. The first liquid surface 66 is at a level below the standard level position SH when the liquid container 24 is running out of the liquid.

The tank unit 26 further includes the liquid surface detecting portion 63 configured to detect the surface level of the liquid stored in the first chamber 62. The liquid surface detecting portion 63 may detect that the first liquid surface 66 is at the standard level position SH. The liquid surface detecting portion 63 may detect that the first liquid surface 66 is at a level below the standard level position SH. The liquid surface detecting portion 63 may detect that the first liquid surface 66 is at a full level position. The full level position is above the standard level position SH. The maximum amount of liquid is stored in the first reservoir portion 33 when the first liquid surface 66 is at the full level position. The control portion 19 may determine the liquid container 24 as being empty when the liquid surface detecting portion 63 detects that the first liquid surface 66 is at a level below the standard level position SH, and then may prompt the user to replace this liquid container 24 with another one.

The standard level position SH is set to be, for example, a position above the downstream end of the collection flow passage 39 in the first chamber 62. If set so, when the first liquid surface 66 is at the standard level position SH, the liquid stored in the first reservoir portion 33 is able to flow into the liquid ejecting head 23 through the collection flow passage 39.

Structure of Second Reservoir Portion 35

Next, the second reservoir portion 35 will now be explained.

The second chamber 68 is connected to the other end of the outlet flow passage 34. The second chamber 68 stores the liquid supplied from the first chamber 62. The second reservoir portion 35 may include the second chamber 68 and the second opening-to-atmosphere portion 69, by which the second chamber 68 is partitioned off from the pressurizing flow passage 51.

The second opening-to-atmosphere portion 69 is able to open the inside of the second chamber 68 to atmosphere. The second opening-to-atmosphere portion 69 is made of, for example, a vapor-liquid separator film. This vapor-liquid separator film is a film member that has a function of allowing air to pass through itself and not allowing liquid to pass through itself, similarly to the vapor-liquid separator film of the first opening-to-atmosphere portion 64.

The liquid stored in the first reservoir portion 33 flows into the second chamber 68 due to a hydraulic head difference from the liquid stored in the second reservoir portion 35. When the internal pressure of the first chamber 62 and the internal pressure of the second chamber 68 are atmospheric pressure, the second liquid surface 70 of the liquid stored in the second reservoir portion 35 is the same in level as the first liquid surface 66. In other words, the second liquid surface 70 is kept at the standard level position SH, which is almost the same as the level of the lower end of the first inlet portion 60, and changes in level within a range below the nozzle surface 21. The liquid present inside the liquid ejecting head 23 is kept to be in negative pressure due to a hydraulic head difference between the liquid stored in the first reservoir portion 33 and the liquid stored in the second reservoir portion 35. When the liquid ejecting head 23 consumes the liquid, the liquid stored in the second reservoir portion 35 is supplied to the liquid ejecting head 23.

When the on-off valve 36 includes a one-way valve, the one-way valve closes the outlet flow passage 34 when the internal pressure of the second reservoir portion 35 is higher than the internal pressure of the first reservoir portion 33. Therefore, the one-way valve closes the outlet flow passage 34 when the pressurizing portion 47 applies pressure to the inside of the second reservoir portion 35.

The control portion 19 (see FIG. 1) controls the open/close operation of the supply valve 38 and the circulation valve 40. The supply valve 38 is capable of opening and closing the supply flow passage 37 when pressure is applied by the pressurizing portion 47. The circulation valve 40 is capable of opening and closing the collection flow passage 39.

Structure of Switching Mechanism 48

Next, the switching mechanism 48 will now be explained.

The switching mechanism 48 includes a thin tube portion 72, which is a part of the connection flow passage 52, and first to eleventh selection valves 73*a* to 73*k*. The thin tube portion 72 is a meandering tube that is thin enough to the extent that the flow of liquid is significantly restricted in relation to the flow of air.

The air flow passage 55 comes into communication with atmosphere when the first selection valve 73*a* opens. The air flow passage 55 comes into communication with the pressure sensor 49 when the second selection valve 73*b* opens. When the third selection valve 73*c* opens, the air flow passage 55 opens, and the pressurizing portion 47 comes into communication with the air chamber 53.

The connection flow passage 52 between the pressurizing portion 47 and the eighth selection valve 73*h* comes into communication with atmosphere when the fourth selection valve 73*d* opens. The connection flow passage 52 comes into communication with the pressure sensor 49 when the fifth selection valve 73*e* opens. The connection flow passage 52 comes into communication with atmosphere when the sixth selection valve 73*f* and the seventh selection valve 73*g* open. The connection flow passage 52 opens when the eighth selection valve 73*h* opens. The thin tube portion 72 comes into communication with atmosphere when the ninth selection valve 73*i* opens. When the tenth selection valve 73*j* opens, the opening-to-atmosphere path 50 opens, and the first reservoir portion 33 comes into communication with the connection flow passage 52. When the eleventh selection valve 73*k* opens, the pressurizing flow passage 51 opens, and the second reservoir portion 35 comes into communication with the connection flow passage 52.

To change the internal pressure of the air chamber 53, the switching mechanism 48 opens the second to fourth selection valves 73*b* to 73*d* and closes the other selection valves. When the pressurizing portion 47 is driven in the forward direction in this state, air that is present inside the air chamber 53 exits through the air flow passage 55 and the connection flow passage 52 and, therefore, the internal pressure of the air chamber 53 decreases. When the pressurizing portion 47 is driven in the reverse direction in this state, air is taken into the air chamber 53 through the connection flow passage 52 and the air flow passage 55 and, therefore, the internal pressure of the air chamber 53 increases. The pressure sensor 49 may detect the internal pressure of the air flow passage 55 and the air chamber 53 at this time. The control portion 19 (see FIG. 1) may control the driving of the pressurizing portion 47 based on the detection result of the pressure sensor 49.

To open the first reservoir portion 33 to atmosphere, the switching mechanism 48 opens the sixth selection valve 73*f* and the tenth selection valve 73*j*. The first chamber 62 comes into communication with atmosphere through the opening-to-atmosphere path 50 and the connection flow passage 52.

To open the second reservoir portion 35 to atmosphere, the switching mechanism 48 opens the seventh selection valve 73*g* and the eleventh selection valve 73*k*. The second chamber 68 comes into communication with atmosphere through the pressurizing flow passage 51 and the connection flow passage 52.

To apply pressure to the inside of the second reservoir portion 35, the switching mechanism 48 opens the first selection valve 73*a*, the fifth selection valve 73*e*, the eighth selection valve 73*h*, and the eleventh selection valve 73*k*, and closes the other selection valves. When the pressurizing portion 47 is driven in the forward direction in this state, air flows into the second chamber 68 through the air flow passage 55, the connection flow passage 52, and the pressurizing flow passage 51 and, therefore, the internal pressure of the second chamber 68 increases. The pressure sensor 49 may detect the internal pressure of the connection flow passage 52, the pressurizing flow passage 51, and the second chamber 68 at this time. The control portion 19 may control the driving of the pressurizing portion 47 based on the detection result of the pressure sensor 49.

Structure of Liquid Container 24

Next, with reference to FIGS. 3 and 4, a structure of the liquid container 24 will now be explained.

Figure 3:
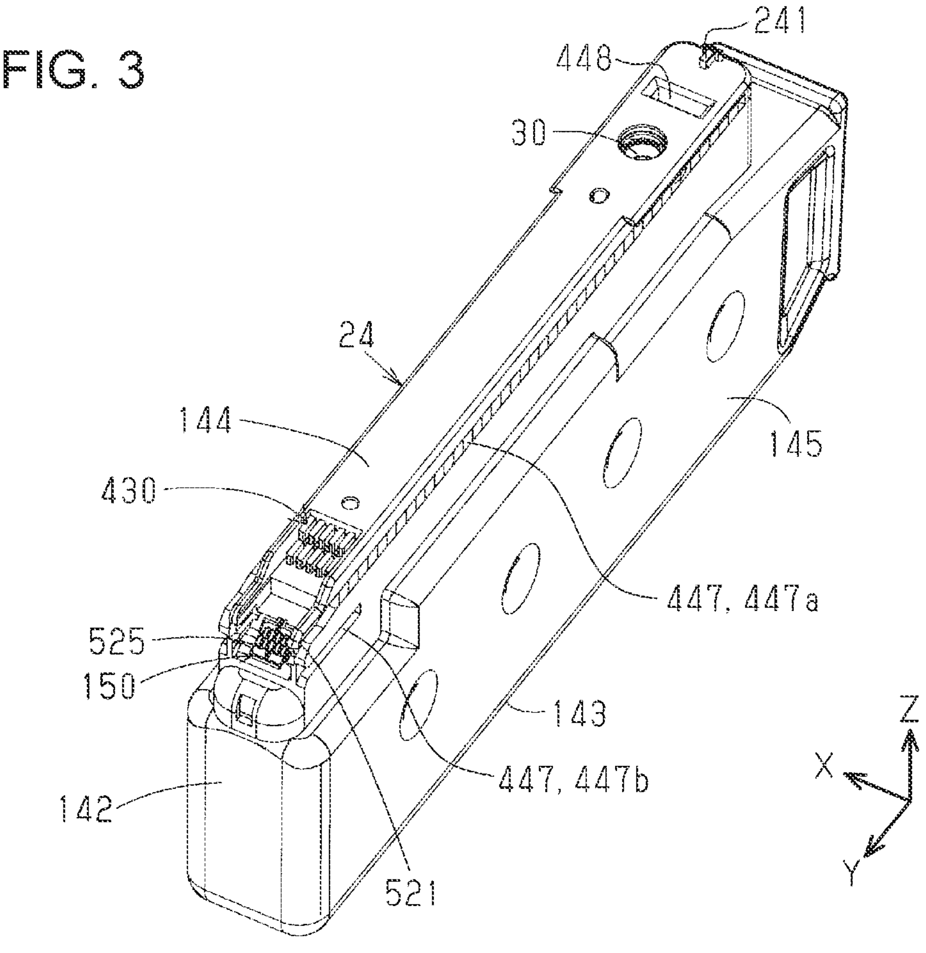
FIG. 3 is a perspective view of a liquid container.
Figure 4:
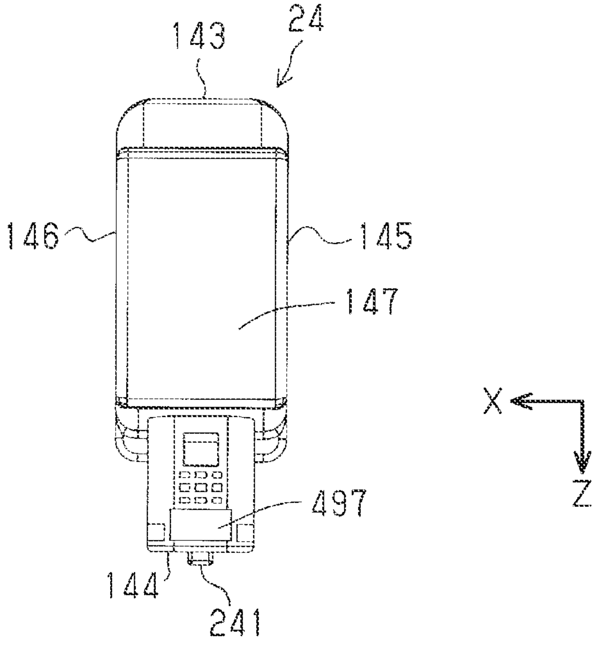
FIG. 4 is a rear view of the liquid container illustrated in FIG. 3.

As illustrated in FIGS. 3 and 4, for example, the liquid container 24 is a cartridge that has a first end wall 142, a top wall 143, a bottom wall 144, a first sidewall 145, a second sidewall 146, and a second end wall 147. When the liquid container 24 starts being inserted in the process of being attached to the liquid ejecting apparatus 11, the first end wall 142 is the first to be inserted.

As illustrated in FIG. 3, an identification portion 430 for identifying the type of the liquid container 24 may be provided on the bottom wall 144 of the liquid container 24. The identification portion 430 may be, for example, a plurality of protrusions arranged in the width direction.

The liquid container 24 may have a positioning hole 448 in the bottom wall 144. The positioning hole 448 may be a recess formed in the bottom wall 144. The liquid container 24 may have the pouring outlet portion 30 having its opening in the bottom wall 144. The liquid contained in the liquid container 24 flows out of the liquid container 24 via the pouring outlet portion 30. The liquid container 24 may have a release portion 241 protruding down from the bottom wall 144. The release portion 241, the positioning hole 448, the pouring outlet portion 30 may be arranged in this order as viewed from the second end wall 147 toward the first end wall 142.

As illustrated in FIG. 3, the liquid container 24 may include a circuit board chip 150 provided at a corner-cut portion, meaning that a corner where the bottom wall 144 and the first end wall 142 were supposed to meet with each other is missing. The circuit board chip 150 may include connection terminals 521 and a storage medium 525. The storage medium 525 may store information about the liquid container 24, for example, information about the liquid contained in the liquid container 24.

The liquid container 24 may have two guided portions 447 extending along the Y axis in the first sidewall 145 and the second sidewall 146 respectively. In each of the sidewalls 145 and 146, the guided portion 447 may include a first guided portion 447*a* and a second guided portion 447*b* formed at different positions in height. The first guided portion 447*a* may be a groove extending along the bottom wall 144. The second guided portion 447*b* is located above the first guided portion 447*a*. The second guided portion 447*b* is shorter than the first guided portion 447*a* in the direction along the Y axis. The second guided portion 447*b* may be located near the circuit board chip 150.

As illustrated in FIG. 4, the liquid container 24 has an engagement portion 497 in the second end wall 147. The engagement portion 497 is, for example, a recess formed in the second end wall 147 and located over the release portion 241. The engagement portion 497 may be located at the center of the second end wall 147 in the width direction.

Structure of Attachment Portion 28

Figure 5:
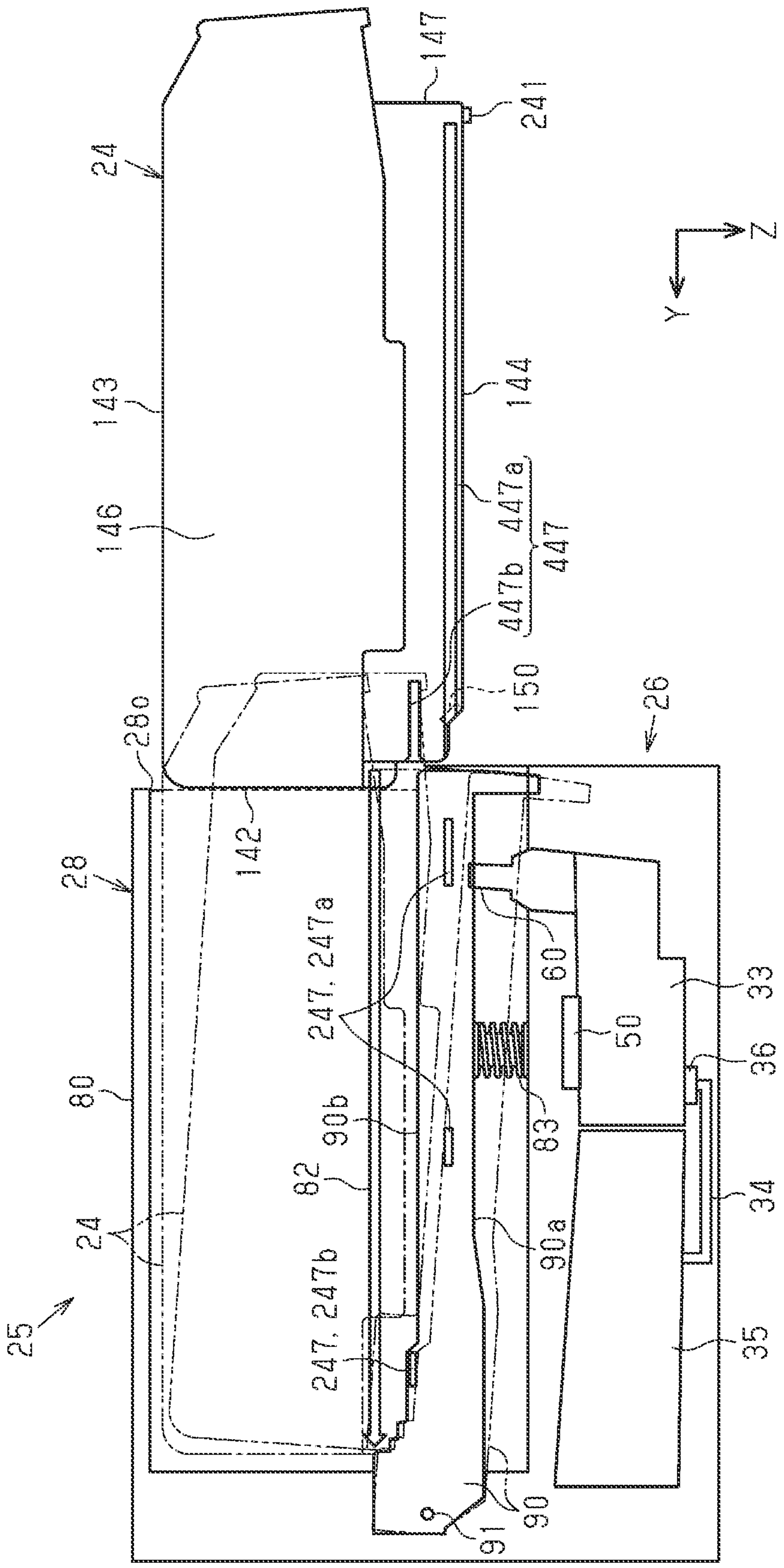
FIG. 5 is a schematic view of a supply unit according to an exemplary embodiment.

As illustrated in FIG. 5, the attachment portion 28 includes a frame 80 like a box, a supporting member 90, a pivot 91, and the first inlet portion 60. The supporting member 90, the pivot 91, and the first inlet portion 60 are disposed inside the frame 80. The liquid container 24 is inserted into the frame 80 through the insertion opening 28*o* and moves toward the rear of the frame 80. The direction of this movement of the liquid container 24, that is, the direction of insertion thereof into the attachment portion 28, is along the Y axis.

The supporting member 90 extends along a linear guiding path 82 (indicated by an open arrow in FIG. 5) intersecting with a vertical line (Z axis). The guiding path 82 extends in the moving direction (along the Y axis). The supporting member 90 has a head-end region and a base-end region. The start end of the guiding path 82 is located at the head-end region. The termination end of the guiding path 82 is located at the base-end region. The base-end region of the supporting member 90 and the pivot 91 are located at the inner rear of the frame 80, namely, at a position distant from the insertion opening 28*o*. The supporting member 90 may have a bottom plate 90*a* and two side ribs 90*b*. The two side ribs 90*b* are arranged at the respective two ends of the bottom plate 90*a* in the width direction.

The pivot 91 is disposed at the base-end region of the supporting member 90. The pivot 91 has its axial line intersecting with both of the vertical line (Z axis) and the guiding path 82 (Y axis). The axial line of the pivot 91 extends along the X axis. The supporting member 90 is configured to rotate on the pivot 91 between a guiding position, which is a position for guiding the liquid container 24 along the guiding path 82 (indicated by alternate long and short dash lines in FIG. 5), and a connection position, which is a position for connection of the liquid container 24 to the first inlet portion 60 (indicated by alternate long and two short dash lines in FIG. 5).

The first inlet portion 60 is disposed below the supporting member 90. The first inlet portion 60 becomes connected to the liquid container 24 when the supporting member 90 comes to the connection position. The first inlet portion 60 may be in a tilted position with respect to the guiding path 82 (which is horizontal). More specifically, the first inlet portion 60 may be tilted such that its head end (upper end) is located closer to the insertion opening 28*o* than its base end (lower end) is. For example, the axial line of the first inlet portion 60 may be inclined with respect to the vertical line (Z axis) within an angular range of 0° to 15°.

The liquid container 24 may include one or more guiding portions 247 configured to guide the movement of the liquid container 24. For example, the guiding portions 247 may be a pair of guide rails provided on the side ribs 90*b* making up a pair. Alternatively, a single guide rail may be provided on the bottom plate 90*a*.

The guiding portion 247 may include a first guiding portion 247*a* and a second guiding portion 247*b* disposed such that the first guided portion 447*a* and the second guided portion 447*b* are configured to come into engagement therewith respectively. The guiding portion 247*a*, 247*b* may be, for example, a protruding portion extending in the length direction of the supporting member 90. The second guiding portion 247*b* is located above the first guiding portion 247*a*. The second guiding portion 247*b* is shorter than the first guiding portion 247*a* in the length direction. The second guiding portion 247*b* may be located closer to the pivot 91 than the first guiding portion 247*a* is. The first guiding portion 247*a* may be disposed at a position corresponding to the first inlet portion 60 in the direction of the movement of the liquid container 24.

The attachment portion 28 may include a first urging member 83 configured to urge the supporting member 90 from the connection position toward the guiding position. The first urging member 83 is, for example, a coil spring. In an initial state in which there is no liquid container 24 in the attachment portion 28, the supporting member 90 is located at the guiding position by being urged by the first urging member 83.

Figure 6:
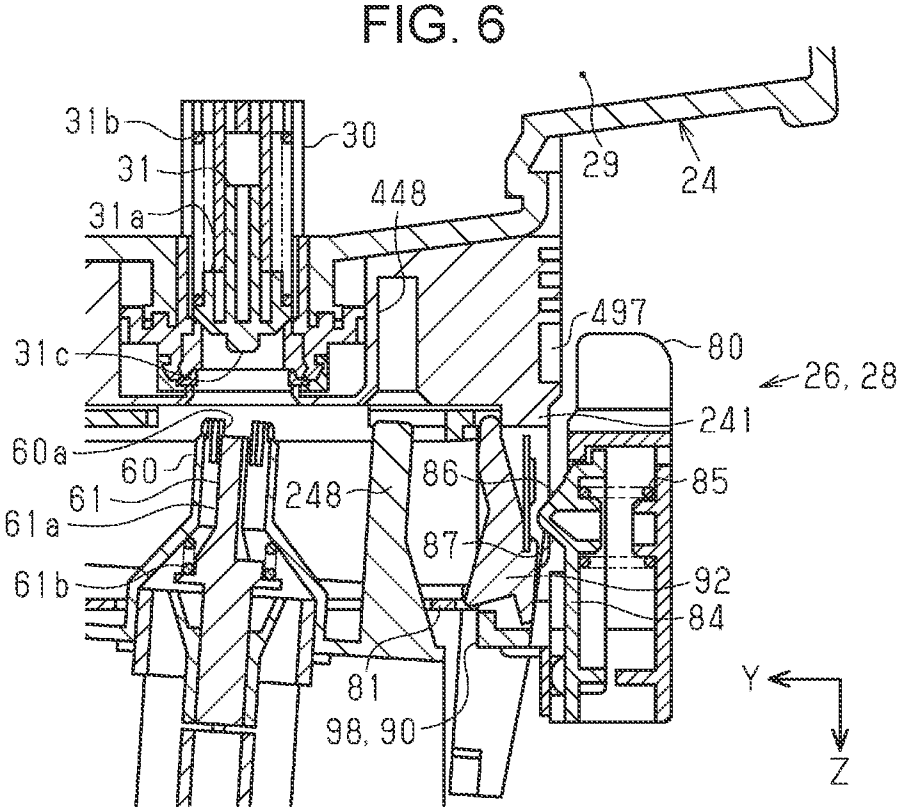
FIG. 6 is a cross-sectional view illustrating a head-end region of a supporting member when a liquid container is inserted into the supply unit illustrated in FIG. 5.

As illustrated in FIG. 6, the attachment portion 28 may have a positioning protruding portion 248 protruding upward near the first inlet portion 60. The liquid container 24 is positioned by the mating engagement of the positioning hole 448 with the positioning protruding portion 248. The positioning protruding portion 248 may be inclined at the same angle as that of the first inlet portion 60. The bottom plate 90*a* (see FIG. 5) has a cutout portion at a region over the positioning protruding portion 248 and the first inlet portion 60.

As illustrated in FIG. 6, the attachment portion 28 may include a latching lever 84 disposed in such a way as to face the head end of the supporting member 90. The latching lever 84, the positioning protruding portion 248, and the first inlet portion 60 may be arranged in this order along the Y axis. The latching lever 84 may have a base end (lower end) and a head end (upper end). The base end may be fixed to the frame 80. The attachment portion 28 may include a second urging member 85 configured to urge the head end of the latching lever 84 toward the supporting member 90.

The latching lever 84 is disposed in such a way as to latch onto the liquid container 24 supported by the supporting member 90 when the supporting member 90 is located at the connection position. The latching lever 84 may have a first sloped surface 86 extending obliquely downward from the head end and a second sloped surface 87 extending obliquely downward from the lower end of the first sloped surface 86. The first sloped surface 86 and the second sloped surface 87 form a protrusion protruding toward the supporting member 90.

Figure 7:
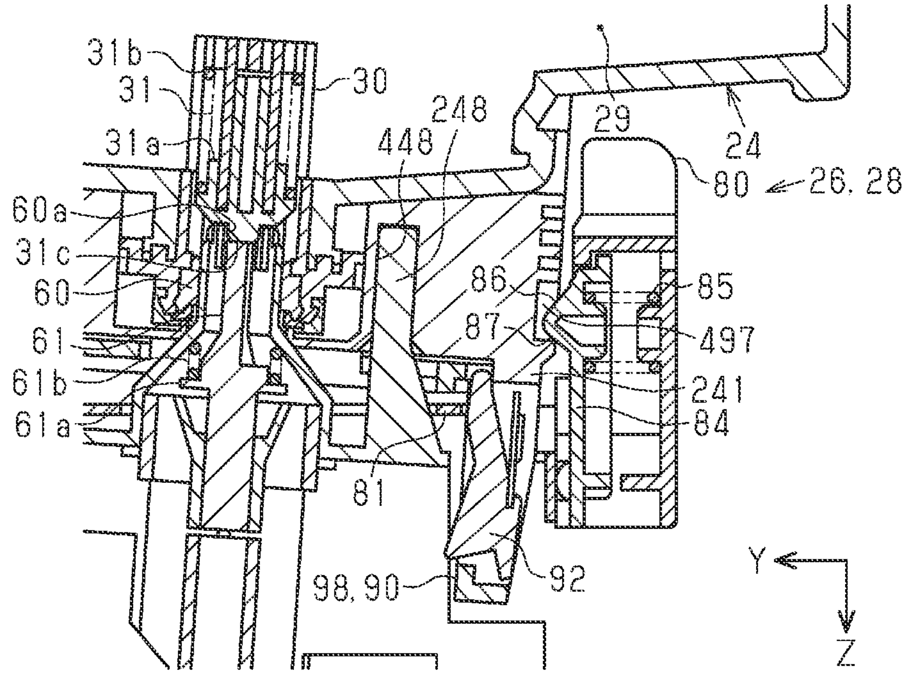
FIG. 7 is a cross-sectional view illustrating a structure when the supporting member illustrated in FIG. 6 is located at a connection position.

The first sloped surface 86 engages with the liquid container 24 when the supporting member 90 rotates along a rotation path from the guiding position (position illustrated in FIG. 6) toward the connection position (position illustrated in FIG. 7). The second sloped surface 87 engages with the liquid container 24 when the supporting member 90 is located at the connection position and when the supporting member 90 rotates from the connection position toward the guiding position.

Next, with reference to FIGS. 6 and 7, a structure of the outlet valve 31 of the pouring outlet portion 30 and a structure of the inlet valve 61 of the first inlet portion 60 will now be explained.

As illustrated in FIG. 6, the outlet valve 31 of the liquid container 24 includes a valve body 31*a* and an elastic member 31*b*. The elastic member 31*b* urges the valve body 31*a* outward (downward in FIG. 6). The outlet valve 31 closes when the valve body 31*a* urged by the elastic member 31*b* is located at a valve-closing position closer to the outside as illustrated in FIG. 6. The outlet valve 31 opens when the valve body 31*a* is pushed inward (upward in FIG. 7) against an urging force applied by the elastic member 31*b* as illustrated in FIG. 7.

As illustrated in FIG. 6, the inlet valve 61 of the first inlet portion 60 includes a valve body 61*a* and an elastic member 61*b*. The elastic member 61*b* urges the valve body 61*a* outward (upward in FIG. 6). The inlet valve 61 closes when the valve body 61*a* urged by the elastic member 61*b* is located at a valve-closing position closer to the outside as illustrated in FIG. 6. The inlet valve 61 opens when the valve body 61*a* is pushed inward (downward in FIG. 7) against an urging force applied by the elastic member 61*b* as illustrated in FIG. 7.

As illustrated in FIG. 6, the valve body 31*a* of the outlet valve 31 has a protruding portion 31*c* at its tip. As illustrated in FIG. 7, in a state in which the liquid container 24 is attached to the attachment portion 28, the protruding portion 31*c* of the valve body 31*a* pushes the valve body 61*a* of the inlet valve 61 inward (downward in FIG. 7). The valve body 31*a* of the outlet valve 31 is pushed upward at this time. As a result, in a state in which the liquid container 24 is attached to the attachment portion 28, the pouring outlet portion 30 and the first inlet portion 60 are connected to each other, with both of the outlet valve 31 and the inlet valve 61 being opened.

Operation of Supply Unit 25

Next, operation performed when the liquid container 24 is attached to the supply unit 25 will now be explained.

As illustrated in FIG. 5, the liquid container 24 is inserted into the frame 80 through the insertion opening 28*o*. After the first guided portions 447*a* of the liquid container 24 come into engagement with the first guiding portions 247*a* inside the frame 80, the liquid container 24 moves horizontally along the guiding path 82 extending along the Y axis by being guided by the first guiding portions 247*a*. The movement of the liquid container 24 in the width direction in this process is restricted by the two first guiding portions 247*a* arranged in the width direction. The upward movement of the liquid container 24 while being guided along the path is restricted by the frame 80. The downward movement of the liquid container 24 while being guided along the path is restricted by a lock lever 92 (see FIG. 7).

When the liquid container 24 comes to a position near the termination end of the guiding path 82, the second guided portions 447*b* come into engagement with the second guiding portions 247*b*. An electric coupling portion (not illustrated) may be disposed between the first guiding portions 247*a* and the second guiding portions 247*b* in the vertical direction Z. In this case, the connection terminals 521 are positioned appropriately toward the electric coupling portion in the vertical direction Z. The liquid container 24 may be positioned in the width direction by an identification shape portion disposed near the electric coupling portion.

The connection terminals 521 are coupled to the electric coupling portion when the liquid container 24 arrives at the termination end of the guiding path 82. This makes it possible to perform data communication between the circuit board chip 150 and the control portion 19 (see FIG. 1). The second end wall 147 of the liquid container 24 is either exposed to the outside of the frame 80 or is located at a position where it is operable from the outside of the frame 80 at this time.

Next, the user pushes the rear end (the right end in FIG. 5) of the liquid container 24 downward while pushing the liquid container 24 in the inserting direction against an urging force applied by a fourth urging member (not illustrated). Because of this pushing, the supporting member 90 rotates in a clockwise direction in FIG. 5 around the pivot 91 against an urging force applied by the first urging member 83. In the process of rotation of the liquid container 24, first, the positioning protruding portion 248 becomes inserted in the positioning hole 448 (see FIGS. 6 and 7), and, next, the pouring outlet portion 30 becomes connected to the first inlet portion 60.

Due to expansion and contraction of an urging spring (not illustrated), a small change in position of the liquid container 24 along the Y axis is allowed while keeping the coupling of the connection terminals 521 to the electric coupling portion (not illustrated). The positioning protruding portion 248 is disposed near the first inlet portion 60, and the positioning protruding portion 248 is inclined at the same angle as that of the first inlet portion 60; therefore, the pouring outlet portion 30 is guided toward the first inlet portion 60 properly.

In the process of rotation of the supporting member 90 to the connection position, the liquid container 24 supported by the supporting member 90 comes into contact with the first sloped surface 86 of the latching lever 84. The upper end of the latching lever 84 pushed by the liquid container 24 changes its position outward (rightward in FIG. 5) in such a way as to get out of the way of rotation of the supporting member 90 against an urging force applied by the second urging member 85. When the protrusion of the latching lever 84 comes into engagement with the engagement portion 497 of the liquid container 24, the supporting member 90 stops and stays at the connection position due to the urging force applied by the second urging member 85. The attachment of the liquid container 24 is completed in this way.

As illustrated in FIG. 7, the pouring outlet portion 30 becomes connected to the first inlet portion 60 when the attachment of the liquid container 24 is completed. Both of the outlet valve 31 and the inlet valve 61 are in an open state at this time. Since the liquid container 24 is disposed over the first inlet portion 60, the liquid contained in the liquid container 24 flows into the first reservoir portion 33 via the first inlet portion 60 due to a hydraulic head difference.

Next, operation performed when the liquid container 24 is detached from the supply unit 25 will now be explained.

To detach the liquid container 24 from the attachment portion 28, the user pulls the rear end (the right end in FIG. 5) of the liquid container 24 upward against the urging force applied by the second urging member 85. In this process, since the engagement portion 497 is in engagement with the second sloped surface 87, the supporting member 90 rotates smoothly together with the liquid container 24. When the protrusion of the latching lever 84 becomes disengaged from the engagement portion 497, the supporting member 90 rotates from the connection position to the guiding position around the pivot 91 due to the urging force applied by the first urging member 83.

In the process of rotation of the supporting member 90 from the connection position to the guiding position, the pouring outlet portion 30 becomes disconnected from the first inlet portion 60, and the positioning protruding portion 248 gets out of the positioning hole 448. In the process of disconnection of the pouring outlet portion 30 from the first inlet portion 60, both of the outlet valve 31 and the inlet valve 61 become closed. Upon the arrival of the supporting member 90 at the guiding position, the liquid container 24 is pushed toward the start end of the guiding path 82 due to the urging force applied by the fourth urging member (not illustrated). Since the liquid container 24 is guided by the first guiding portions 247*a* and the second guiding portions 247*b*, the connection terminals 521 are uncoupled from the electric coupling portion (not illustrated) of the attachment portion 28 quickly without being twisted. At the same time, the release portion 241 is released from a first arm (not illustrated), and the lock lever 92 returns to a lock position due to an urging force applied by the third urging member (not illustrated).

The user thereafter draws the liquid container 24 toward the outside of the frame 80. The liquid container 24 that is being drawn outward is guided by the first guiding portions 247*a*. Since the rotation of the supporting member 90 is restricted by the lock lever 92, the liquid container 24 moves horizontally along the Y axis without any contact with the first inlet portion 60.

Detailed Structure of Tank Unit 26

Next, with reference to FIGS. 8 and 10, a detailed structure of the tank unit 26 will now be explained.

Figure 8:
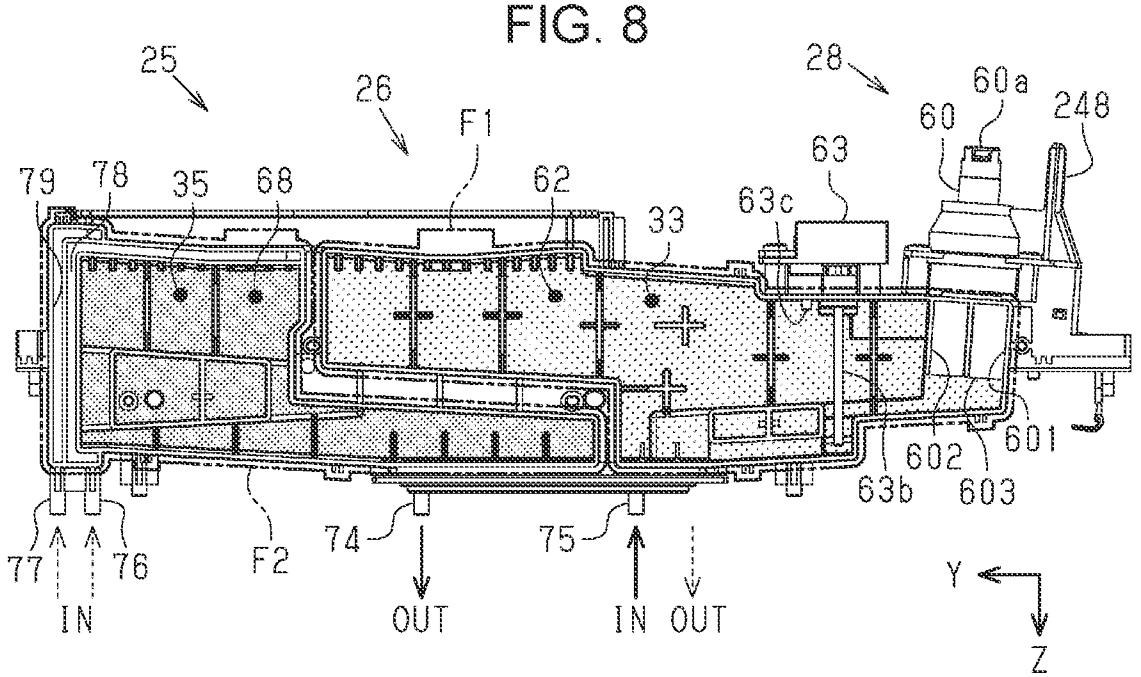
FIG. 8 is a side view of a tank unit.
Figure 10:
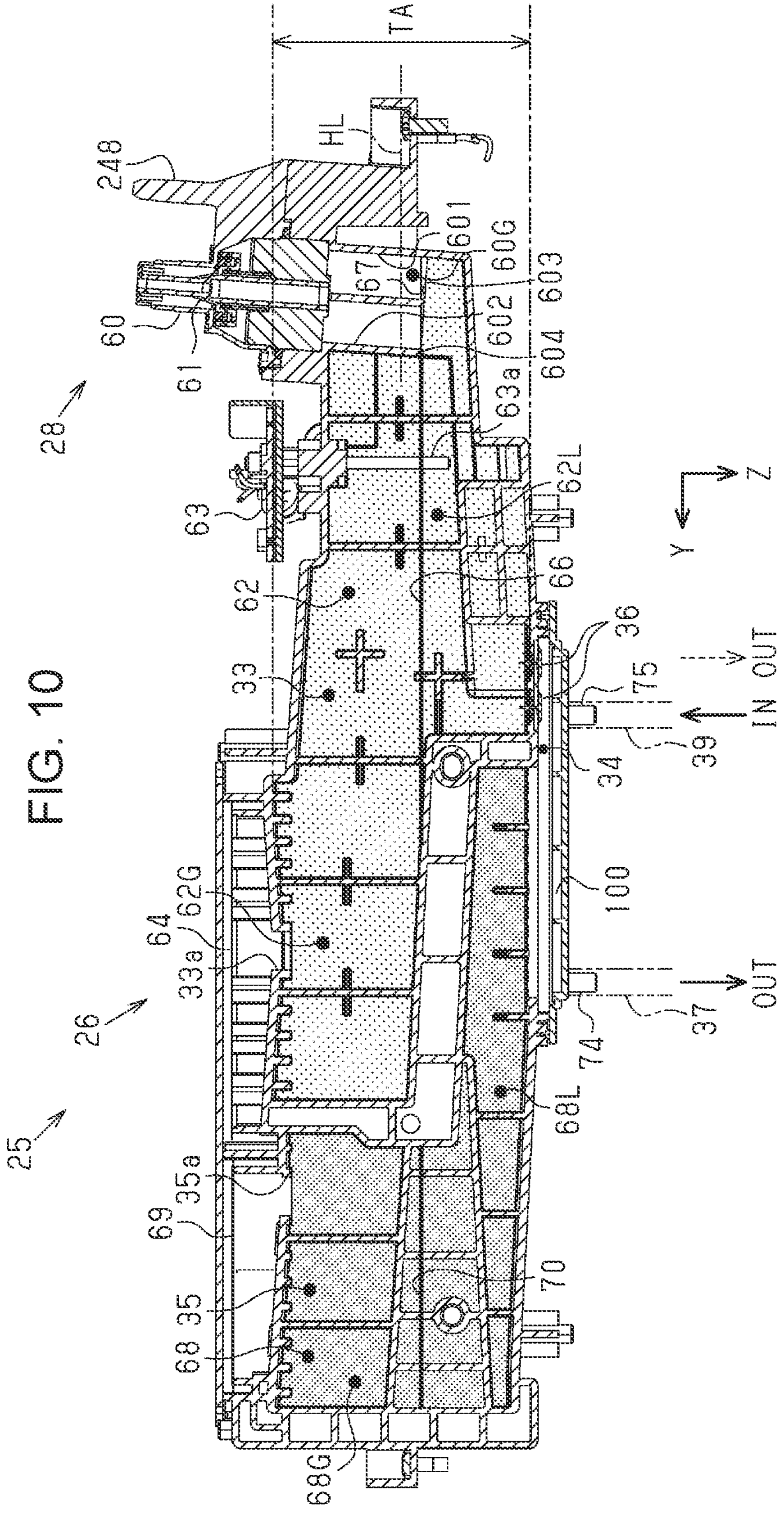
FIG. 10 is a side cross-sectional view of the tank unit.

As illustrated in FIGS. 8 and 10, the tank unit 26 includes the first inlet portion 60, the first chamber 62, and the second chamber 68. The first chamber 62 and the second chamber 68 are formed as chambers by pasting films F1 and F2 to the sides of the synthetic-resin frame constituting the reservoir portions of the tank unit 26.

The first inlet portion 60 is configured to be connected to the liquid container 24 (see FIG. 2) attached to the attachment portion 28. The first inlet portion 60 becomes connected to the pouring outlet portion 30 (see FIG. 2) of the liquid container 24 when the liquid container 24 is attached to the attachment portion 28. In the attached state, the liquid supplied from the liquid container 24 flows into the first chamber 62 via the first inlet portion 60.

As illustrated in FIGS. 8 and 10, the first inlet portion 60 is connected to the first chamber 62 via an opening portion 603 at some midpoint in the vertical direction Z of the first chamber 62. The first inlet portion 60 has an inlet passage 601 serving as a flow passage for liquid flowing in from the liquid container 24. The inlet passage 601 may extend obliquely downward with respect to the vertical direction Z as illustrated in FIGS. 8 and 10. Alternatively, the inlet passage 601 may extend in the vertical direction Z. The first inlet portion 60 has the opening portion 603 at the downstream end of the inlet passage 601 in the direction in which the liquid flows. In the example illustrated in FIGS. 8 and 10, the first inlet portion 60 has an inlet 60*a*, via which the liquid flows in from the liquid container 24 (see FIG. 2) attached to the attachment portion 28, and the first inlet portion 60 is connected to the first chamber 62 via the opening portion 603 formed at an opposite end located opposite of the inlet 60*a*. As described here, the first inlet portion 60 is connected to the first chamber 62 via the opening portion 603 at the downstream end of the inlet passage 601 passing inside through the first inlet portion 60 in the direction in which the liquid flows. The opening plane of the opening portion 603 may be inclined with respect to a horizontal plane as illustrated in FIGS. 8 and 10. Alternatively, the opening plane of the opening portion 603 may be a horizontal plane.

The first inlet portion 60 may have a regulating portion 602 for partitioning off the inlet passage 601 from the first chamber 62. The regulating portion 602 serves as a partition plate between the inlet passage 601 and the first chamber 62. The regulating portion 602 has a function of regulating, to the standard level position SH, the first liquid surface 66 indicating the level of the liquid stored in the first chamber 62.

As illustrated in FIGS. 8 and 10, the tank unit 26 includes the outlet portion 74 and the second inlet portion 75. The outlet portion 74 is in communication with the second chamber 68. The liquid stored in the second chamber 68 is configured to flow out via the outlet portion 74 toward the liquid ejecting head 23 (see FIG. 2). The outlet portion 74 is connected to one end of the supply flow passage 37, which is in communication with the liquid ejecting head 23 (see FIG. 2).

The second inlet portion 75 is in communication with the first chamber 62. The liquid collected from the liquid ejecting head 23 is configured to flow in via the second inlet portion 75. The second inlet portion 75 is in communication with one end of the collection flow passage 39, which is in communication with the liquid ejecting head 23.

As illustrated in FIG. 8, the tank unit 26 includes a first connection portion 76 to which the opening-to-atmosphere path 50 is connected. The opening-to-atmosphere path 50 (see FIG. 2) is, for example, a tube. One end of this tube is connected to the first connection portion 76. The first connection portion 76 is, for example, a conduit connector portion to which a conduit such as a tube can be connected. The tank unit 26 includes an air flow passage 78 that is in communication with the first connection portion 76. The air flow passage 78 is in communication with the inside of the first chamber 62 via the first opening-to-atmosphere portion 64 illustrated in FIG. 10. More specifically, the first reservoir portion 33 has an opening-to-atmosphere port 33*a* illustrated in FIG. 10. The first chamber 62 is in communication with the air flow passage 78 illustrated in FIG. 8 via the opening-to-atmosphere port 33*a* and the first opening-to-atmosphere portion 64.

The first chamber 62 of the tank unit 26 is in communication with the opening-to-atmosphere path 50 (see FIG. 2) via the first opening-to-atmosphere portion 64, the air flow passage 78, and the first connection portion 76. Therefore, a first vapor-phase portion 62G inside the first chamber 62 is open to atmosphere. As described earlier, when the first opening-to-atmosphere portion 64 includes a vapor-liquid separator film, it is possible to open the inside of the first chamber 62 to atmosphere while preventing the liquid stored in the first chamber 62 from leaking out.

As illustrated in FIG. 8, the tank unit 26 includes a second connection portion 77 that is in communication with the second chamber 68. The second connection portion 77 is in communication with the second opening-to-atmosphere portion 69. The second connection portion 77 is connected to the pressurizing flow passage 51. The pressurizing flow passage 51 is, for example, a tube. One end of this tube is connected to the second connection portion 77. The second connection portion 77 is in communication with a second air flow passage 79.

The second air flow passage 79 is in communication with the second chamber 68 via the second opening-to-atmosphere portion 69. The second chamber 68 is in communication with the pressurizing flow passage 51 (see FIG. 2) via the second opening-to-atmosphere portion 69, the second air flow passage 79, and the second connection portion 77. The pressurization of the second chamber 68 is performed by supplying pressurized air from the pressurizing portion 47 into the second chamber 68 through the pressurizing flow passage 51, the second connection portion 77, the second air flow passage 79, and the second opening-to-atmosphere portion 69. More specifically, the second reservoir portion 35 has an opening-to-atmosphere port 35*a* illustrated in FIG. 10. The second chamber 68 is in communication with the air flow passage 79 illustrated in FIG. 8 via the opening-to-atmosphere port 35*a* and the second opening-to-atmosphere portion 69.

When the time for cleaning has come, the control portion 19 drives the pressurizing portion 47 to supply pressurized air therefrom into the second chamber 68, thereby applying pressure to the liquid stored in the second chamber 68. As a result, the liquid is forced out through the nozzles 22 of the liquid ejecting head 23. The cleaning of the liquid ejecting head 23 is performed in this way. The cleaning prevents the nozzles 22 of the liquid ejecting head 23 from becoming clogged or unclogs the clogged nozzles, etc.

When the second opening-to-atmosphere portion 69 includes a vapor-liquid separator film, it is possible to supply pressurized air into the second chamber 68 while preventing the liquid stored in the second chamber 68 from leaking out. Pressurized air may be supplied from the pressurizing portion 47 into the first chamber 62 through the opening-to-atmosphere path 50.

As illustrated in FIG. 10, the opening portion 603 may be located below the center HL inside the first chamber 62 in the vertical direction Z. In FIG. 10, a region where the first chamber 62 exists in the vertical direction Z (Z-axis direction) is defined as a reservoir chamber area TA. The first inlet portion 60 is connected to the first chamber 62 at some midpoint in height within the reservoir chamber area TA in the vertical direction Z. The opening portion 603 is provided at the lower end of the inlet passage 601 of the first inlet portion 60. The first inlet portion 60 is connected to the first chamber 62 via the opening portion 603 at some midpoint in height within the reservoir chamber area TA in the vertical direction Z. The regulating portion 602, which is a part of members forming the inlet passage 601, serves as a partition between the inlet passage 601 and the first chamber 62.

A lower end 604 of the regulating portion 602 regulates the liquid-level position of the first liquid surface 66 to the standard level position SH. That is, the position of the lower end 604 of the regulating portion 602 is set such that the first liquid surface 66 will be at the standard level position SH. The first liquid surface 66 rises in level when the liquid flows in from the liquid container 24. Then, the first liquid surface 66 rising in level reaches the lower end 604 of the regulating portion 602. Upon the reaching thereof, the supply of the liquid from the liquid container 24 via the first inlet portion 60 stops.

The inside of the first chamber 62 is divided into a first liquid-phase portion 62L, which is a liquid-phase portion where liquid is stored, and the first vapor-phase portion 62G, which is a vapor-phase portion where air is present, with the first liquid surface 66 being the boundary therebetween. That is, the first chamber 62 is divided into the first liquid-phase portion 62L, which is a region located below the first liquid surface 66, and the first vapor-phase portion 62G, which is a region located above the first liquid surface 66.

The inside of the second chamber 68 is divided into a second liquid-phase portion 68L, which is a liquid-phase portion where liquid is stored, and a second vapor-phase portion 68G, which is a vapor-phase portion where air is present, with the second liquid surface 70 being the boundary therebetween. That is, the second chamber 68 is divided into the second liquid-phase portion 68L, which is a region located below the second liquid surface 70, and the second vapor-phase portion 68G, which is a region located above the second liquid surface 70. The upper portion of a region including the inside of the inlet passage 601 is formed as an inlet vapor-phase portion 60G, which is a vapor-phase portion where air is present, with a liquid surface 67 being the boundary therebetween. The liquid-level position of the liquid surface 67 is almost the same as that of the first liquid surface 66.

As illustrated in FIGS. 8 and 10, the liquid surface detecting portion 63 includes a first detecting portion 63*a*, a second detecting portion 63*b*, and a third detecting portion 63*c*. The first detecting portion 63*a* illustrated in FIG. 10 detects the first liquid surface 66 that is at the standard level position SH. The control portion 19 determines that the liquid-level position of the first liquid surface 66 is normal when the first liquid surface 66 that is at the standard level position SH. When the first detecting portion 63*a* is no longer able to detect the first liquid surface 66 due to a deviation of the first liquid surface 66 from the standard level position SH beyond a tolerable range, the control portion 19 may adjust the first liquid surface 66 to a liquid-level position detectable by the first detecting portion 63*a*. For example, the control portion 19 may adjust the liquid-level position of the first liquid surface 66 to the standard level position SH by controlling the internal pressure of the first chamber 62 through the first opening-to-atmosphere portion 64 by controlling the pressurizing portion 47 and the switching mechanism 48.

The second detecting portion 63*b* illustrated in FIG. 8 detects the first liquid surface 66 (see FIG. 10) when the amount of the liquid left in the first chamber 62 is less than an END threshold. The second detecting portion 63*b* detects that the amount of the liquid left in the first chamber 62 has reached "END". When the amount of the liquid left has reached "END", the control portion 19 causes the display portion 15*a* to display a message, etc. that prompts the user to replace this liquid container 24 with another one.

The third detecting portion 63*c* illustrated in FIG. 8 detects the first liquid surface 66 (see FIG. 10) when the first liquid surface 66 is at a full level position in excess of the standard level position SH. By detecting the first liquid surface 66 that is at the full level position, the third detecting portion 63*c* prevents the leakage of the liquid through the nozzles 22 of the liquid ejecting head 23. Moreover, by detecting the first liquid surface 66 that is that is close to an overflow liquid level, the third detecting portion 63*c* prevents the leakage of the liquid stored in the first chamber 62 through the opening-to-atmosphere port 33*a*. The full level position is set to be a liquid level which is before reaching the overflow liquid level and at which the leakage of the liquid through the nozzles 22 does not occur due to a hydraulic head difference between the nozzles 22 of the liquid ejecting head 23 and the first liquid surface 66.

As illustrated in FIGS. 8 and 10, when viewed in the vertical direction Z, the first chamber 62 and the second chamber 68 overlap at least partially. In the example illustrated in FIGS. 8 and 10, the first chamber 62 has an overhang portion protruding in the horizontal direction, and the second chamber 68 has an underlying portion protruding in the horizontal direction, and when viewed in the vertical direction Z, the first chamber 62 and the second chamber 68 are arranged in such a layout that the overhang portion and the underlying portion overlap.

The first chamber 62 is the detection-target reservoir chamber configured such that the amount of liquid left in the tank unit 26 is detected by the liquid surface detecting portion 63. For the purpose of reducing variation in END detection precision when the amount of the liquid left in the first chamber 62 has reached "END", it is preferable if the percentage of change in liquid level per unit amount of liquid is large when the amount of the liquid left in the first chamber 62 has become small. Therefore, it is preferable if the first chamber 62 has a shape the capacity of the lower portion of which is smaller than the capacity of the upper portion thereof. On the other hand, for the purpose of enabling the first chamber 62 to accommodate liquid forced out by thermal expansion at the vapor-phase portion inside the liquid container 24 due to a change in temperature, it is preferable if the first chamber 62 has a large capacity. For these reasons, preferably, the first chamber 62 should have a shape that has a large capacity at its upper portion though the capacity of its lower portion is small, as illustrated in FIGS. 8 and 10. In the example illustrated in FIGS. 8 and 10, the first chamber 62 has an overhanging shape whose upper portion protrudes in the horizontal direction in comparison with its lower portion.

Since there is no need to detect the second liquid surface 70, the second chamber 68 can be configured to have a shape that has a larger capacity at its lower portion than its upper portion as illustrated in FIGS. 8 and 10. In the example illustrated in FIGS. 8 and 10, the second chamber 68 has a shape whose lower portion protrudes in the horizontal direction in comparison with its upper portion.

As illustrated in FIGS. 8 and 10, when viewed in the vertical direction Z, the first chamber 33 and the second chamber 35 are arranged in such a manner that the upper portion of the first chamber 33 protruding in the horizontal direction overhangs the lower portion of the second chamber 35 protruding in the horizontal direction to form an overlap. Therefore, the first chamber 62 and the second chamber 68 are arranged efficiently inside a substantially rectangular accommodation space.

As illustrated in FIG. 10, the tank unit 26 may further include a filter 100 provided between the second chamber 68 and the outlet portion 74 and configured to trap foreign objects contained in the liquid. The term "foreign objects" as used herein include air bubbles, fine dust particles, etc. contained in the liquid. The filter 100 may be provided also between the first chamber 62 and the second inlet portion 75. In this case, a single common filter may be provided as the filter 100, or, alternatively, individual filters may be provided separately.

Figure 9:
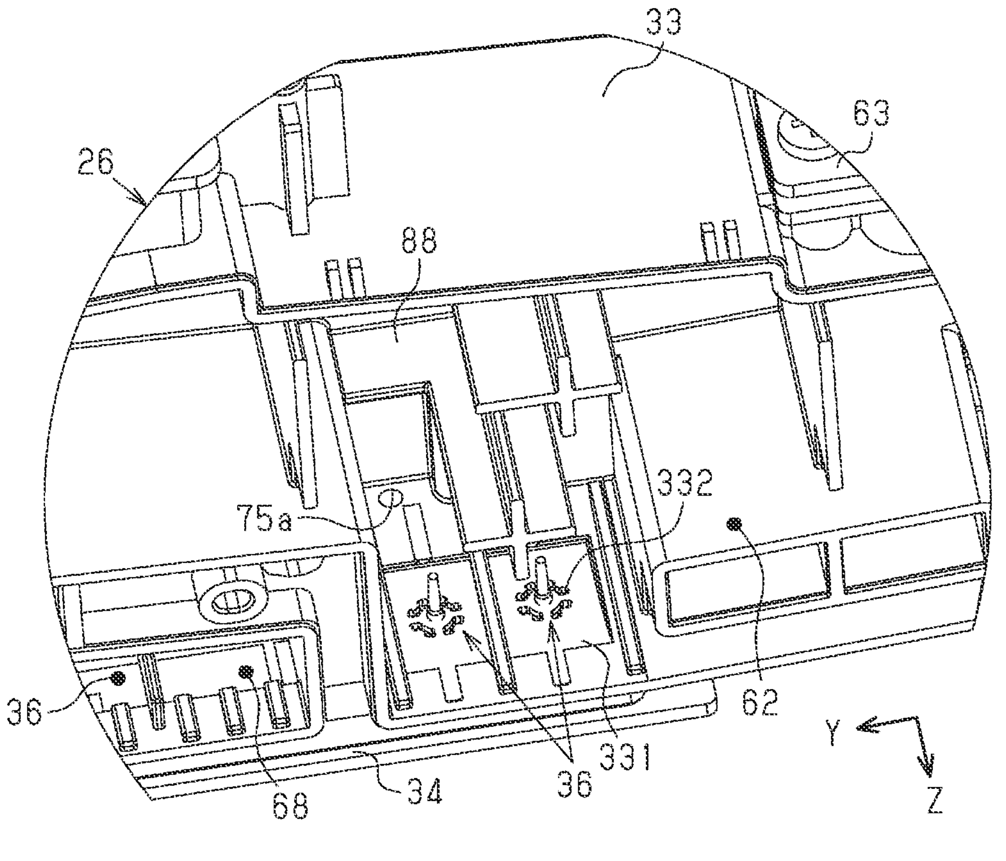
FIG. 9 is a perspective view illustrating a neighborhood of a joint of a first reservoir portion and a second reservoir portion.

As illustrated in FIG. 9, the first chamber 62 may have a cover portion 88 inside. The cover portion 88 may be provided vertically over the second inlet portion 75 formed in a lower surface inside the first chamber 62. As illustrated in FIG. 9, a communication opening 75*a* through which the second inlet portion 75 is in communication with the first chamber 62 is formed in the lower surface (inner bottom surface) of the first chamber 62. The cover portion 88 is provided vertically over the communication opening 75*a*. The cover portion 88 has a shape like an eave for covering the communication opening 75*a*. When a returning flow of liquid enters from the second inlet portion 75, in some instances the liquid gushes out with great energy from the communication opening 75*a* into the first chamber 62. Even in this case, the liquid gushing out hits against the cover portion 88, and the energy of the gushing flow of the liquid is therefore abated. This prevents the liquid flowing in through the communication opening 75*a* from gushing up to a position near the opening-to-atmosphere port 33*a*.

As illustrated in FIG. 10, the on-off valve 36 includes a one-way valve that tolerates flow of the liquid from the first chamber 62 toward the second chamber 68 and does not tolerate flow of the liquid from the second chamber 68 toward the first chamber 62. In the example illustrated in FIG. 10, a plurality of (for example, two) on-off valves 36 is provided. A detailed structure of the one-way valve of the on-off valve 36 will be described later.

As illustrated in FIG. 10, the opening-to-atmosphere portion 64 includes a vapor-liquid separator film. The vapor-liquid separator film is, for example, a breathable film. The vapor-liquid separator film allows air to pass and does not allow liquid to pass. The liquid-repellent performance of a surface of the breathable film is set, with water supposed. The breathable film has lower liquid repellency when the liquid is ink than when the liquid is water, and permeation is thus easier when the liquid is ink than when the liquid is water. Therefore, a liquid-repellent agent or an antifoam agent may be applied to the breathable film to make the permeation of ink harder.

Liquid Container 24

As illustrated in FIG. 10, the first chamber 62 necessitates the vapor-phase portion 62G. Since the inside of the liquid container 24 is a hermetically-closed space, in some instances liquid is forced out of the liquid container 24 into the first chamber 62 when thermal expansion of internal air occurs due to a change in temperature. Therefore, the vapor-phase portion 62G is set so as to ensure sufficient capacity that is large enough for accommodating the liquid even when the maximum possible amount of the liquid is forced out of the liquid container 24 by the thermal expansion of the internal air of the liquid container 24.

As illustrated in FIG. 1, the capacity of the liquid container 24 differs depending on the type of the liquid (for example, ink color). The liquid container 24 for black ink is wider than that for color ink. Similarly to the liquid container 24, the first reservoir portion 33 for black ink is wider than that for color ink. Therefore, the vapor-phase portion 62G of the first chamber 62 for black ink, as can be read from FIG. 1, is larger than that for color ink. Given the same percentage of use (percentage of supply) of the liquid (e.g., ink), the vapor-phase portion for black ink is larger than that for color ink, and an amount of the liquid forced out when the thermal expansion of the air of the vapor-phase portion for black ink occurs is larger than that for color ink. In the example of the present embodiment, the vapor-phase portion 62G of the first chamber 62 for black ink is larger than that for color ink. Therefore, even when the liquid is forced out of the liquid container 24 by the thermal expansion of the internal air of the liquid container 24 due to a change in temperature, the first chamber 62 is able to accommodate the liquid flowing in, without causing any overflow.

As illustrated in FIG. 10, the first inlet portion 60 is inclined at a predetermined angle. The predetermined angle is a predetermined angular value within a range of, for example, 1° to 15°. Therefore, the liquid container 24 is attached with inclination at a predetermined angle with respect to the vertical direction Z, similarly to the inclination of the first inlet portion 60. Since the liquid container 24 is attached with inclination at the predetermined angle, it is possible to use up the liquid almost without a significant leftover in the liquid container 24.

Detection of Tilt of Tank Unit 26

Figure 12:
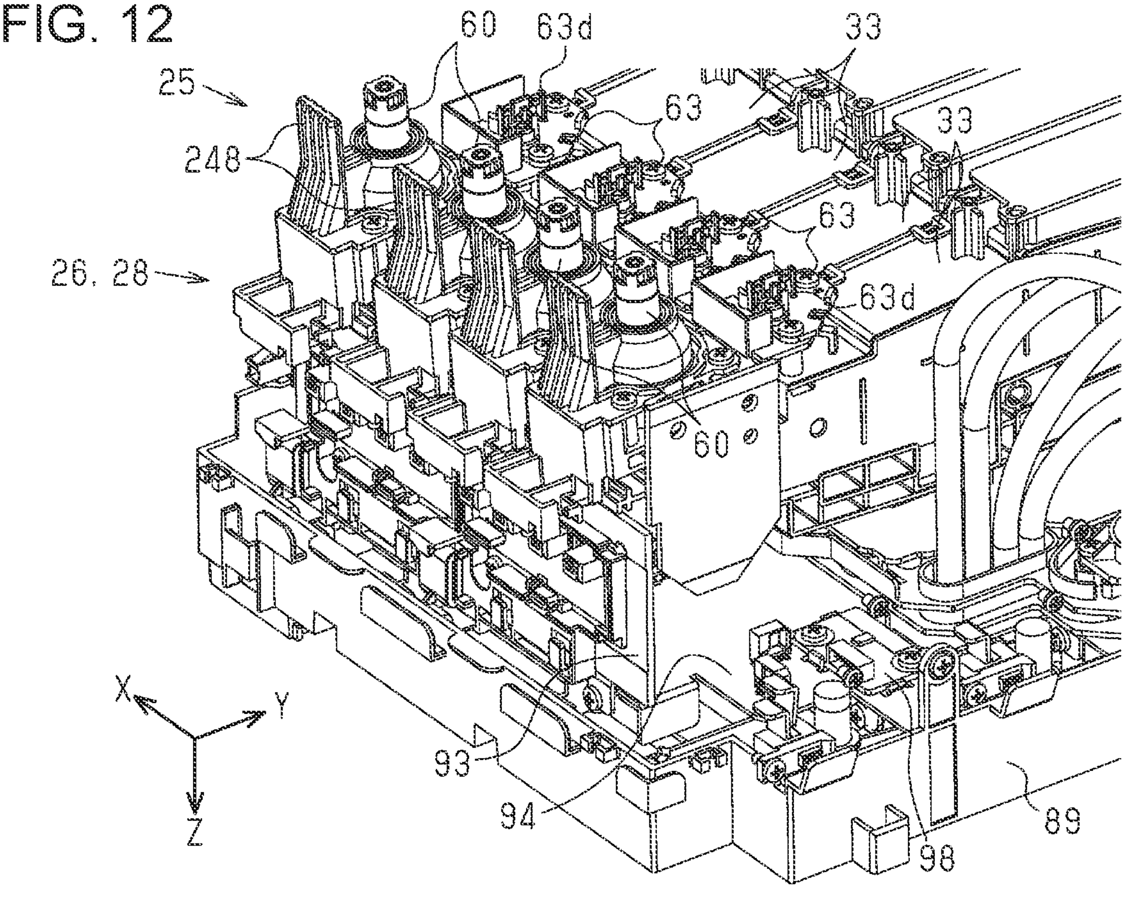
FIG. 12 is a left perspective view of the attachment portion of the tank unit.

As illustrated in FIG. 12, the tank unit 26 further includes a tilt detecting portion 98 that detects the tilt of the tank unit 26 itself. The tilt detecting portion 98 is supported in a state of being fixed to a frame 89 that supports the tank unit 26.

The tilt detecting portion 98 outputs a detection signal obtained by detecting the tilt of the tank unit 26 to the control portion 19.

Based on the detection signal supplied from the tilt detecting portion 98, the control portion 19 determines whether the angle of the tilt of the tank unit 26 exceeds an angular threshold or not. When the angle of the tilt of the tank unit 26 exceeds the angular threshold, the control portion 19 prohibits the liquid ejecting apparatus 11 from performing print operation (liquid ejecting operation). In addition, the control portion 19 causes the display portion 15*a* to display a message, etc. that prompts the user to adjust the tilt of the liquid ejecting apparatus 11. One of the causes of excessive inflow of the liquid from the liquid container 24 into the first reservoir portion 33 is a tilt exceeding the tolerance of the tank unit 26. Therefore, the control portion 19 may cause the display portion 15*a* to display a message, etc. that prompts the user to adjust the tilt of the liquid ejecting apparatus 11 when the angle of the tilt of the tank unit 26 detected by the tilt detecting portion 98 exceeds a predetermined angular threshold. When the angle of the tilt of the tank unit 26 detected by the tilt detecting portion 98 exceeds a predetermined angular threshold, the control portion 19 may put the liquid ejecting apparatus 11 into a state in which printing cannot be started until the excessive tilt is corrected. In this case, print operation of the liquid ejecting apparatus 11 based on a print instruction given by the user is started when the angle of the tilt detected by the tilt detecting portion 98 becomes less than the angular threshold as a result of the corrective adjustment of the tilt of the liquid ejecting apparatus 11 by the user.

Figure 11:
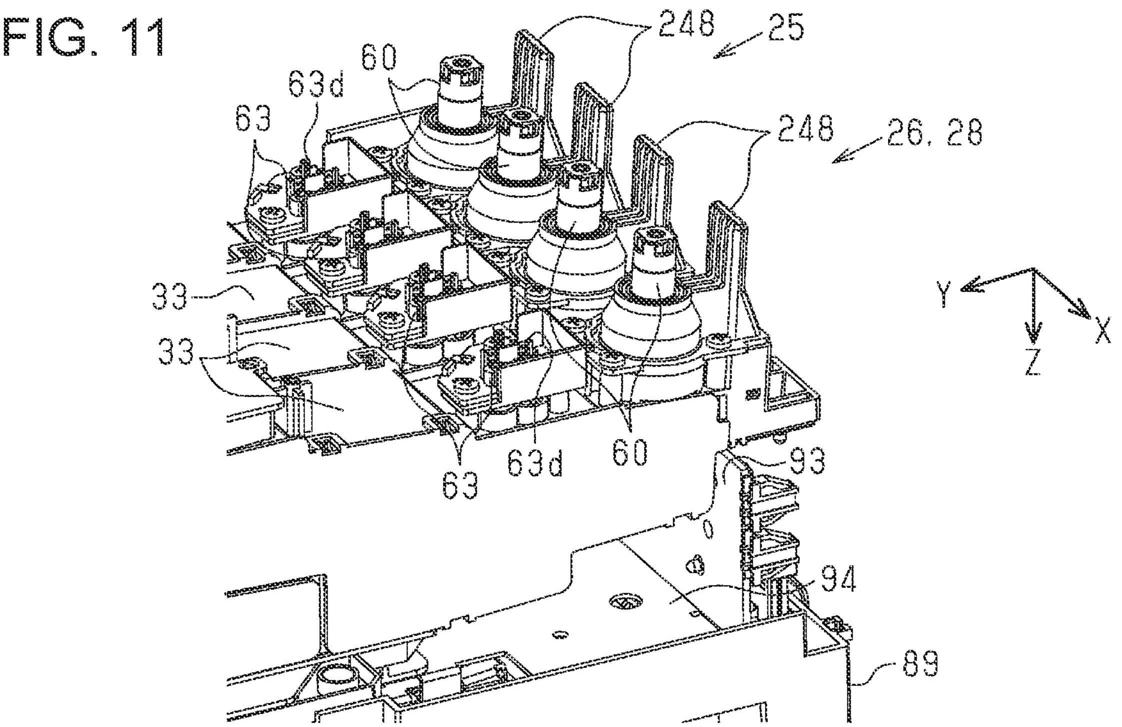
FIG. 11 is a right perspective view of an attachment portion of the tank unit.

As illustrated in FIGS. 11 and 12, in the tank unit 26, plural sets each made up of the first inlet portion 60 and the positioning protruding portion 248 are arranged adjacently along the X axis. Plural liquid surface detecting portions 63 are arranged adjacently along the X axis at respective opposite adjacent positions that are the opposite of the respective positions of the plurality of positioning protruding portions 248 in the direction along the Y axis with respect to the plurality of first inlet portions 60. Respective terminal portions 63*d* of the plurality of liquid surface detecting portions 63 are exposed at the upper surface of the attachment portion 28 as viewed from above. The terminal portions 63*d* are electrically coupled to the control portion 19 via non-illustrated signal lines.

The tank unit 26 includes absorption members 93 and 94 disposed under the first reservoir portion 33. The absorption member 93, 94 has a function of absorbing the liquid such as ink that leaks during the attachment and detachment of the liquid container 24. The absorption members 93 and 94 are disposed throughout an area where they are able to absorb the liquid having spattered from or having trickled down the first inlet portion 60. The liquid spattering from the first inlet portion 60 or the liquid running down along the side surface of the first inlet portion 60 are guided to the first absorption member 93.

The first absorption member 93 is supported on the frame 89 in upright position along the vertical direction Z near a position that is right under the first inlet portion 60. The second absorption member 94 is provided horizontally on the frame 89 in a state in which a part of the second absorption member 94 is in contact with the base end portion of the first absorption member 93. As illustrated in FIG. 11, the two absorption members 93 and 94 form a shape like a letter L in side view. The second absorption member 94 is disposed almost throughout the entire area right under the first reservoir portion 33 and the second chamber 68. Therefore, even in case of the leakage of the liquid from the first reservoir portion 33 or the second chamber 68 or in case of the running of the liquid down along the outer wall surface thereof, the liquid is absorbed by the second absorption member 94.

Structure for Preventing Leakage of Liquid from First Inlet Portion 60

Next, with reference to FIGS. 13 and 14, a structure for preventing the leakage of liquid from the inlet 60*a* of the first inlet portion 60 and for collecting the liquid that has leaked notwithstanding the existence of this leakage prevention structure will now be explained. The tank unit 26 has a liquid leakage prevention structure near and under the first inlet portion 60.

Figure 13:
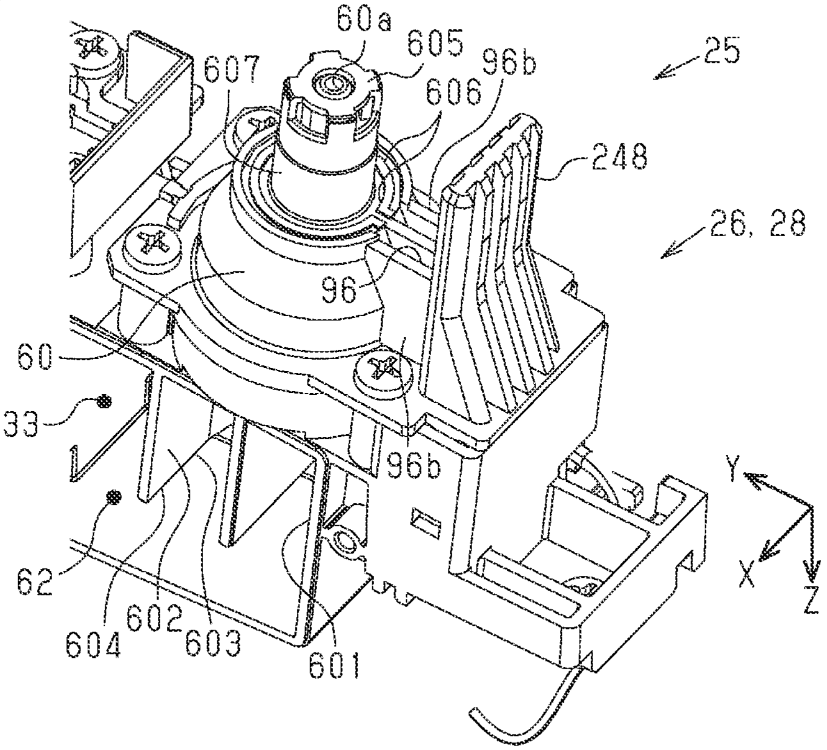
FIG. 13 is a perspective view illustrating a joint portion of the attachment portion.

As illustrated in FIG. 13, the liquid leakage prevention structure is made up of a liquid spattering prevention wall 605, which is provided on the first inlet portion 60, and a liquid collection structure including a guiding groove 606, through which the liquid that has spattered notwithstanding the existence of the liquid spattering prevention wall 605 can be collected.

First, with reference to FIGS. 6, 7, and 14, a phenomenon of the spattering of liquid from the inlet 60*a* that occurs during the detachment of the liquid container 24 will now be explained. A part of liquid that has flowed into the first inlet portion 60 through the pouring outlet portion 30 is left in a space 60*s* that is a part of the flow passage inside the first inlet portion 60. In the process of the detachment of the liquid container 24 from the attachment portion 28, the pressure of the space 60*s* inside the first inlet portion 60 becomes negative due to volume expansion. More specifically, the valve body 61*a* moves up toward the inlet 60*a* while the inlet 60*a* remains closed by the protruding portion 31*c*. The inlet valve 61 becomes closed because of the upward movement of the valve body 61*a*. The inlet 60*a* is still closed by the protruding portion 31*c* (see FIG. 7) even after the closing of the inlet valve 61. Therefore, the space 60*s* inside the first inlet portion 60 (see FIG. 14) is temporarily a closed space. After the forming of this closed space 60*s*, in the process of further upward movement of the protruding portion 31*c* until being pulled out from the inlet 60*a*, the closed space 60*s* is depressurized due to the expansion of the internal air, resulting in negative pressure. The negative pressure acts as a force for sucking up the liquid left in the space 60*s* toward the inlet 60*a*. Therefore, there is a possibility that the liquid might spatter from the inlet 60*a* when the liquid container 24 is detached from the attachment portion 28.

The first inlet portion 60 has the liquid spattering prevention wall 605, which is mounted on the head end portion on the inlet (60*a*) side to cover its periphery, with the inlet 60*a* only being opened. The liquid spattering prevention wall 605 has an annular wall portion covering the periphery of the inlet 60*a*.

As illustrated in FIG. 13, the liquid spattering prevention wall 605 is mounted on the head end portion of the first inlet portion 60 in a surrounding manner, with the inlet 60*a* being opened. Because of the existence of the liquid spattering prevention wall 605, the spattering of the liquid from the inlet 60*a* is considerably suppressed. However, it is impossible to prevent the spattering of the liquid from the inlet 60*a* perfectly.

For this reason, the tank unit 26 has a liquid collection structure for collecting the liquid that has spattered from the inlet 60*a*. The liquid collection structure includes the annular guiding groove 606 illustrated in FIG. 13, a guiding recessed portion 96, a guiding hole 96*a* illustrated in FIG. 14, a guide portion 97, and the first absorption member 93.

The liquid collection structure includes the guiding groove 606 at an area where it can catch the liquid having spattered from the inlet 60*a* and having dropped around the inlet 60*a*. The first inlet portion 60 has a columnar protruding portion 607 having the inlet 60*a* at its mouse. The guiding groove 606 is formed as an annular grooved path in the upper surface of a truncated-cone portion disposed at the base of the protruding portion 607.

Figure 14:
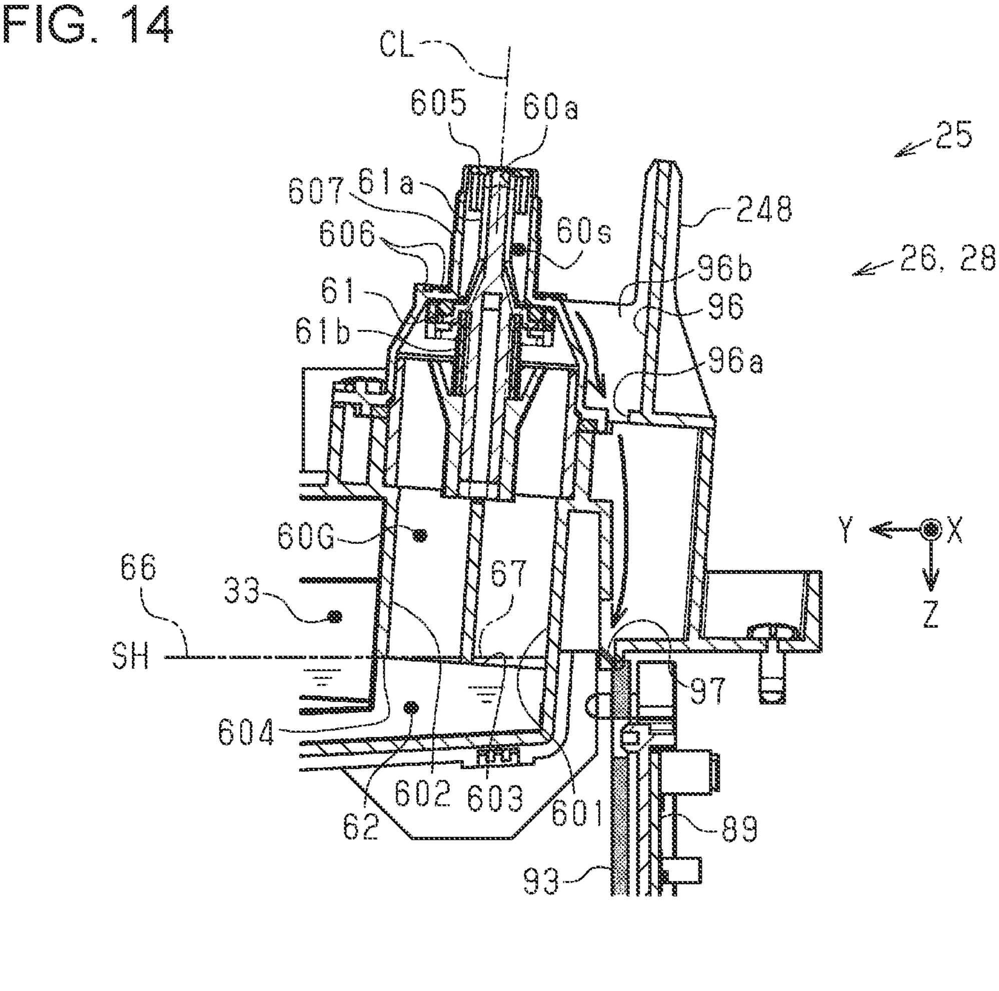
FIG. 14 is a side cross-sectional view of the joint portion.
Figure 15:
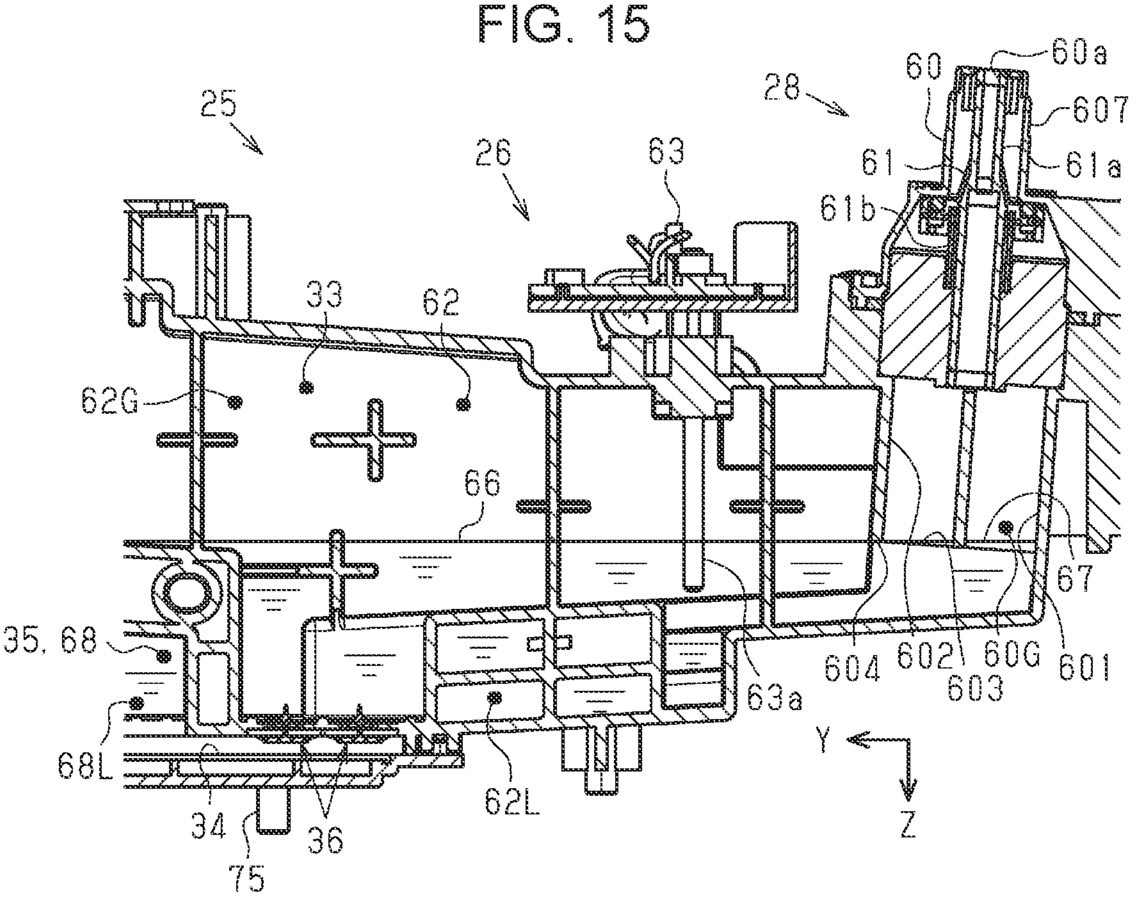
FIG. 15 is a side cross-sectional view of an essential part of the tank unit.

In a side view from the direction along the X axis in FIG. 14, the surface in which the guiding groove 606 is formed is inclined at a predetermined angle with respect to a horizontal plane. The predetermined angle is, for example, substantially equal to the angle of inclination of the axial line CL of the first inlet portion 60 with respect to the vertical direction Z. The annular guiding groove 606 guides the liquid toward a lower position.

As illustrated in FIG. 14, the guiding recessed portion 96 for guiding the liquid from the lower end of the guiding groove 606 downward by causing the liquid to run down along the side surface is formed between the first inlet portion 60 and the positioning protruding portion 248. As illustrated in FIG. 13, the guiding recessed portion 96 is formed by spaces partitioned by three wall plate portions 96*b* arranged at intervals along the X axis between the first inlet portion 60 and the positioning protruding portion 248. The guiding groove 606 is open at its lower end toward the guiding recessed portion 96 in such a way as to be able to guide the liquid to the guiding recessed portion 96. The liquid guided along the annular guiding groove 606 after having spattered from the inlet 60*a* is guided to the guiding recessed portion 96. As illustrated in FIG. 14, the liquid having been guided along the annular guiding groove 606 to the lower side flows through the guiding recessed portion 96 to be guided downward.

As illustrated in FIG. 14, there is the guiding hole 96*a* at the bottom of the guiding recessed portion 96. The liquid having passed through the guiding hole 96*a* runs down along the side surface or drips. The first absorption member 93 is disposed at a position near the lower end of the guiding path of the liquid running down along the side surface or dripping. The guide portion 97 that is partially embedded in the upper portion of the first absorption member 93 is disposed obliquely at a position near the lower end of the guiding path of the liquid. The liquid having been guided down along the guiding path of the liquid is guided by the guide portion 97 to the first absorption member 93 and is then absorbed by the first absorption member 93. The first absorption member 93 is located at an inner position enclosed by the frame 89. Therefore, the liquid having been absorbed by the first absorption member 93 never leaks to the outside of the frame 89.

Structure of On-Off Valve 36

Next, with reference to FIGS. 15 to 18, a structure of the on-off valve 36 will now be explained. The on-off valve 36 is a differential pressure regulating valve configured to be opened and closed by a hydraulic head difference between the first liquid surface 66 of the first chamber 62 and the second liquid surface 70 of the second chamber 68. The on-off valve 36 includes a valve body 101.

Figure 16:
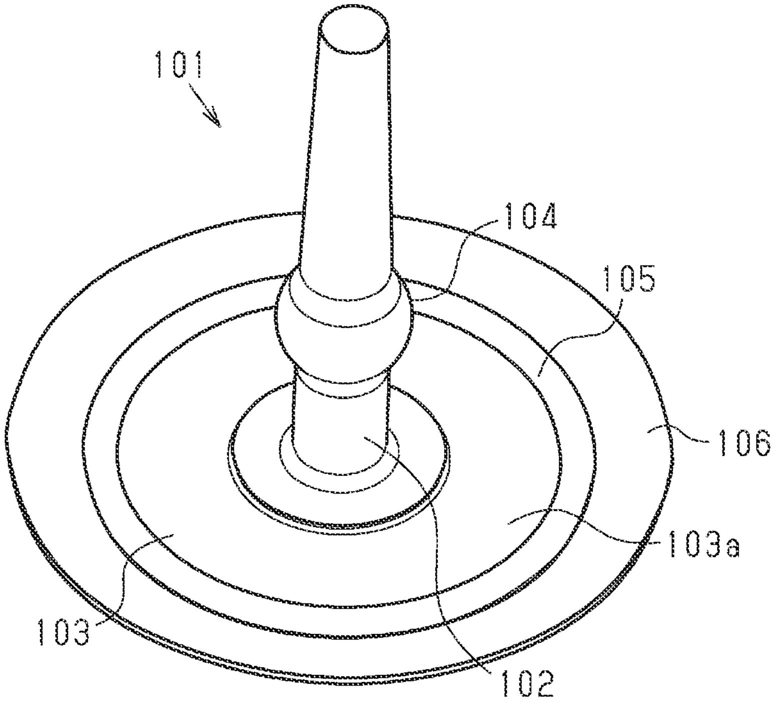
FIG. 16 is a perspective view of a valve body.
Figure 17:
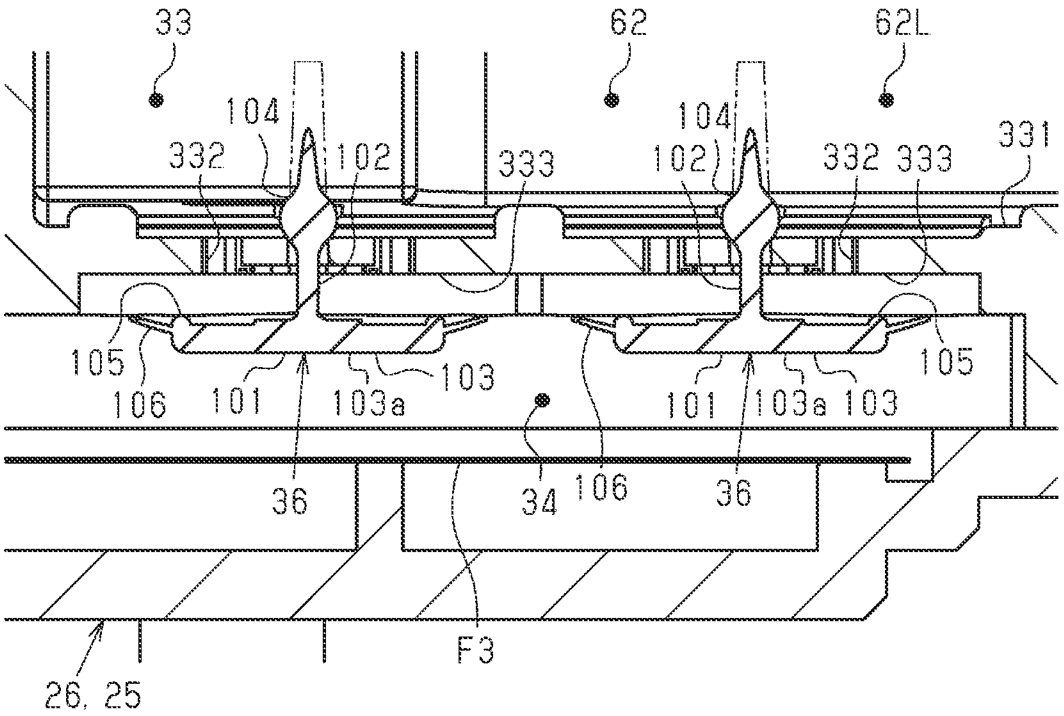
FIG. 17 is a side cross-sectional view illustrating a neighborhood of the valve body.

For example, an umbrella valve, which is an umbrella-type valve body, has been sometimes used in related art as the valve body of this kind of differential pressure regulating valve configured to be opened and closed by a hydraulic head difference. However, if an umbrella valve is used, there is a possibility that minute leakage of liquid might occur because it is difficult to ensure required close contact pressure with a valve seat. Minute leakage of this kind could cause variation in the level of the second liquid surface 70. This means variation in a hydraulic head difference, and has an influence on the size of a liquid droplet ejected from the liquid ejecting head 23, resulting in affecting print quality. Therefore, it is demanded that an amount of minute leakage of this kind should be as small as possible, or, ideally, zero. In view of this, in the present embodiment, the valve body 101 that has a shape illustrated in FIGS. 16 and 17 is used as the valve body of the on-off valve 36. One surface (bottom surface) of the outlet flow passage 34 is made of a film F3 illustrated in FIG. 17.

As illustrated in FIGS. 16 and 17, the valve body 101 includes a shaft portion 102 and a valve portion 103. The shaft portion 102 has a slip stopper portion 104 bulged relatively in a radial direction at some midpoint in its axial direction. The shaft portion 102 extends almost perpendicularly from the center portion of the valve portion 103 having a shape like a disc.

The valve portion 103 includes a valve plate portion 103*a*, which has a shape like a disc with enhanced rigidity achieved by securing a predetermined thickness, a rip portion 105, which is an annular continuous seal protruding from the shaft-portion-side (102) surface of the valve plate portion 103*a*, and an annular flange portion 106, which extends outward in the radial direction from the periphery of the valve plate portion 103*a*. The flange portion 106 is thinner than, and is more flexible than, the valve plate portion 103*a*. The thickness of the flange portion 106 may decrease as it goes toward the outer rim.

As illustrated in FIG. 17, a plurality of valve holes 332 is formed in a partitioning wall portion 331 between the first chamber 62 and the outlet flow passage 34 at positions where the valve bodies 101 are mounted. The plurality of valve holes 332 provides communication between the first chamber 62 and the outlet flow passage 34. The partitioning wall portion 331 has a recessed surface as a surface facing the outlet flow passage 34 at the region where the plurality of valve holes 332 is formed. The bottom of the recessed surface serves as a valve seat 333. In FIG. 17, the valve body 101 is in an open state, in which the valve portion 103 is not in contact with the valve seat 333. The valve body 101 moves in its shaft direction to open and close the plurality of valve holes 332 due to a difference between hydraulic head liquid pressure determined by the level of the first liquid surface 66 of the liquid stored in the first chamber 62 and the level of the second liquid surface 70 of the liquid stored in the second chamber 68, due to the weight of the valve body 101, and due to a buoyant force that acts on the valve body 101 in the liquid. That is, the valve body 101 moves between a valve-opening position, at which the valve portion 103 is not in contact with the valve seat 333 as illustrated in FIG. 17, and a valve-closing position, at which the valve portion 103 is in contact with the valve seat 333 with a predetermined pressuring force. The valve-opening position of the valve body 101 illustrated in FIG. 17 is a mere example. The valve-opening position may be any position at which the rip portion 105 and the flange portion 106 of the valve portion 103 are not in contact with, or have at least a slight clearance from, the valve seat 333, and at which therefore there is a liquid flow through the valve hole 332.

The valve portion of an umbrella valve according to related art has such a shape that, for example, the thickness of the entire valve body decreases gradually as it goes toward the outer rim in the radial direction. Therefore, the valve portion of an umbrella valve according to related art has a comparatively wide flexible potion. For this reason, the valve portion of an umbrella valve according to related art deforms easily due to its high flexibility and, therefore, a pressurizing force applied when the valve portion is in contact with the valve seat is relatively weak. Because of its relatively weak pressuring force, an umbrella valve according to related art has a structure that is prone to minute leakage at a valve-closing position.

By contrast, the valve body 101 according to the present embodiment has a shape like a disc with an almost constant thickness and a comparatively high rigidity. Moreover, the valve body 101 according to the present embodiment has the rip portion 105, which is a continuous seal protruding in an annular shape on the surface, of the valve plate portion 103*a*, facing the valve seat 333. The valve portion 103 has the annular flange portion 106, which extends outward in the radial direction from the periphery of the valve plate portion 103*a*. As described here, the valve body 101 includes the annular rip portion 105 and the annular flange portion 106 located on the outer-rim side to surround the rip portion 105. When the on-off valve 36 is closed, continuous sealing is provided by the press contact of the rip portion 105 with the valve seat 333, and the flange portion 106 is pressed in a slightly deformed state against the surface of the valve seat 333 outside the continuous seal. Therefore, a necessary pressurizing force can be obtained when the valve body 101 is in contact with the valve seat 333 due to the closing of the on-off valve 36.

Moreover, since the on-off valve 36 has the plurality of valve holes 332 whose cross-sectional flow-passage area size is comparatively small as illustrated in FIG. 17, pressure loss is great due to comparatively large flow resistance at the time of opening. Therefore, in order to reduce pressure loss, two on-off valves 36 may be provided side by side as in the example illustrated in FIG. 17. The presence of the two on-off valves 36 increases the total cross-sectional flow-passage area size of the valve holes 332 and thus reduces pressure loss.

The on-off valve 36 is a differential pressure regulating valve that includes a float-type valve body 101 that opens and closes by a hydraulic head difference in the level of the liquid surface between the first chamber 62 and the second chamber 68. The term "float-type valve body" as used herein means a differential pressure regulating valve body that opens and closes by movement of the valve body 101 that is in a state of floating in the liquid because of a difference in liquid pressure due to a hydraulic head difference between the first chamber 62 and the second chamber 68, without using any urging member such as a spring that urges the valve body 101 in a valve-closing direction. Since the on-off valve 36 is a float-type valve that can be opened by a small hydraulic head difference, it opens immediately when there is even a slight difference in liquid level between the first liquid surface 66 and the second liquid surface 70. Therefore, it is possible to adjust the second liquid surface 70 into the same level as the first liquid surface 66, and a difference in liquid level between the first liquid surface 66 and the second liquid surface 70 does not occur easily.

Figure 18:
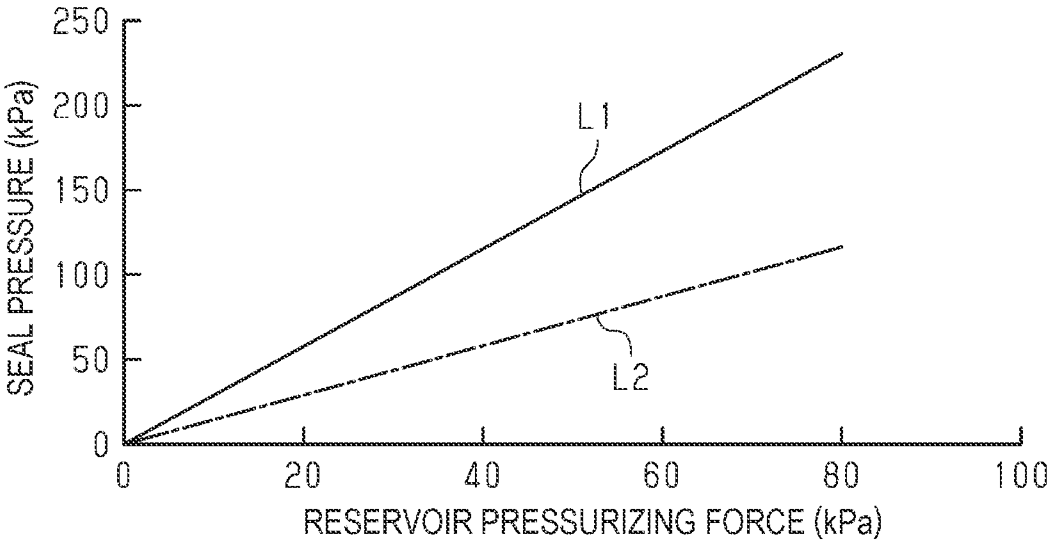
FIG. 18 is a graph that illustrates seal pressure versus reservoir pressurizing force of a valve body according to an exemplary embodiment and seal pressure versus reservoir pressurizing force of a valve body according to a comparative example.

FIG. 18 is a graph that illustrates, for comparison, a pressurizing force applied to the valve seat 333 by the valve body of an umbrella valve according to related art when closed and a pressurizing force applied to the valve seat 333 by the valve body 101 according to the present embodiment when closed. In the graph, the horizontal axis represents reservoir pressurizing force (kPa) which the liquid stored in the second chamber 68 receives from the valve body, and the vertical axis represents seal pressure (kPa) applied when the valve body is in contact with the valve seat 333. The line L1 indicated by a solid line in FIG. 18 shows seal pressure versus reservoir pressurizing force of the valve body 101 according to the present embodiment, and the line L2 indicated by a dot-and-dash line in FIG. 18 shows seal pressure versus reservoir pressurizing force of the valve body of an umbrella valve according to related art. As can be seen from the graph of FIG. 18, the seal pressure versus reservoir pressurizing force of the valve body 101 according to the present embodiment is approximately twice as high as the seal pressure versus reservoir pressurizing force of the valve body of the umbrella valve according to related art. This shows that the seal pressure is made approximately twice as high as that of the related art by adopting a structure in which the valve body 101 includes the rip portion 105, which is an annular continuous seal, and the annular flange portion 106. The reservoir pressurizing force at the use area of the liquid ejecting apparatus 11 is, for example, approximately 5 to 70 (kPa). For example, the reservoir pressurizing force during cleaning is larger than the reservoir pressurizing force during liquid circulation, which is larger than the reservoir pressurizing force during printing. Even during printing in which the reservoir pressurizing force is relatively small, it is possible to ensure sufficient necessary seal pressure. The reservoir pressurizing force at the use area may be changed as may be necessary.

Wrong/Reverse Attachment of Liquid Container 24

Figure 19:
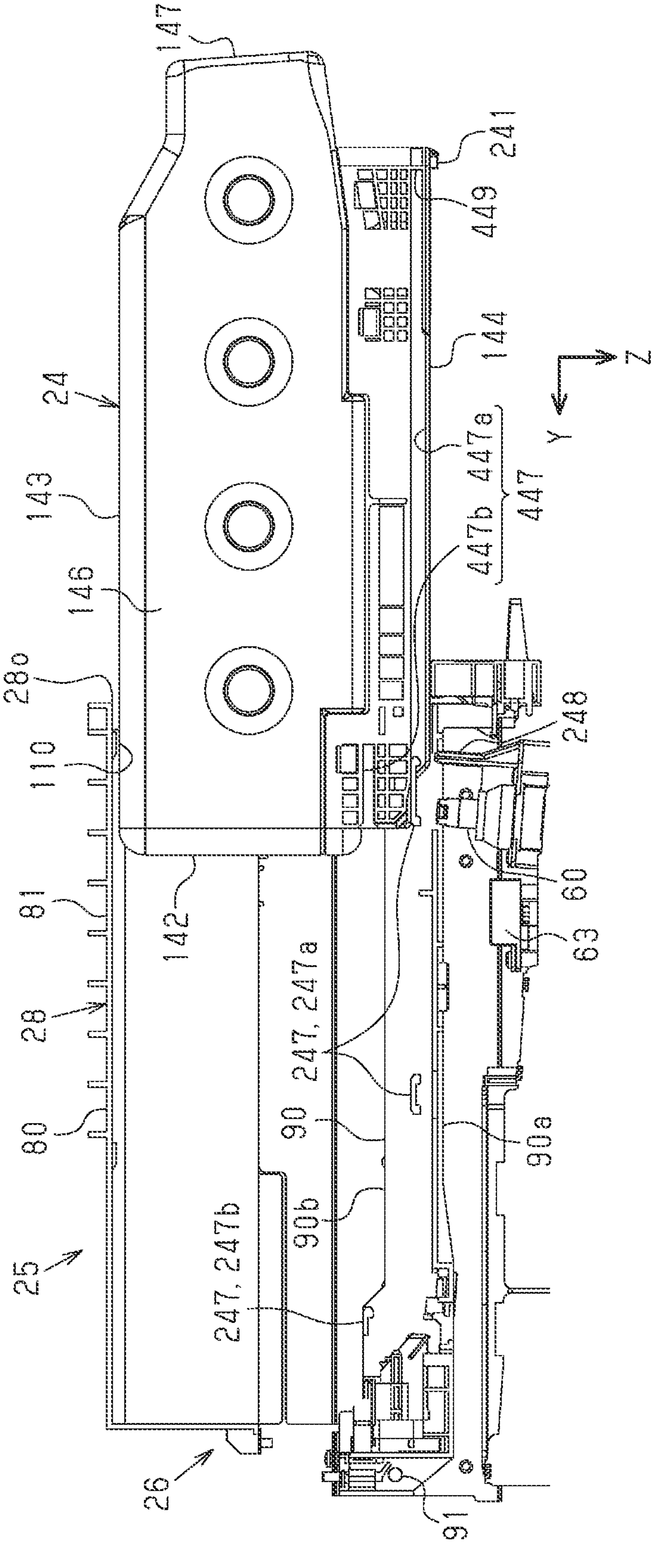
FIG. 19 is a partially-cut-away side view illustrating a process of attachment of a liquid container to the attachment portion of the tank unit with correct front-rear container orientation.
Figure 20:
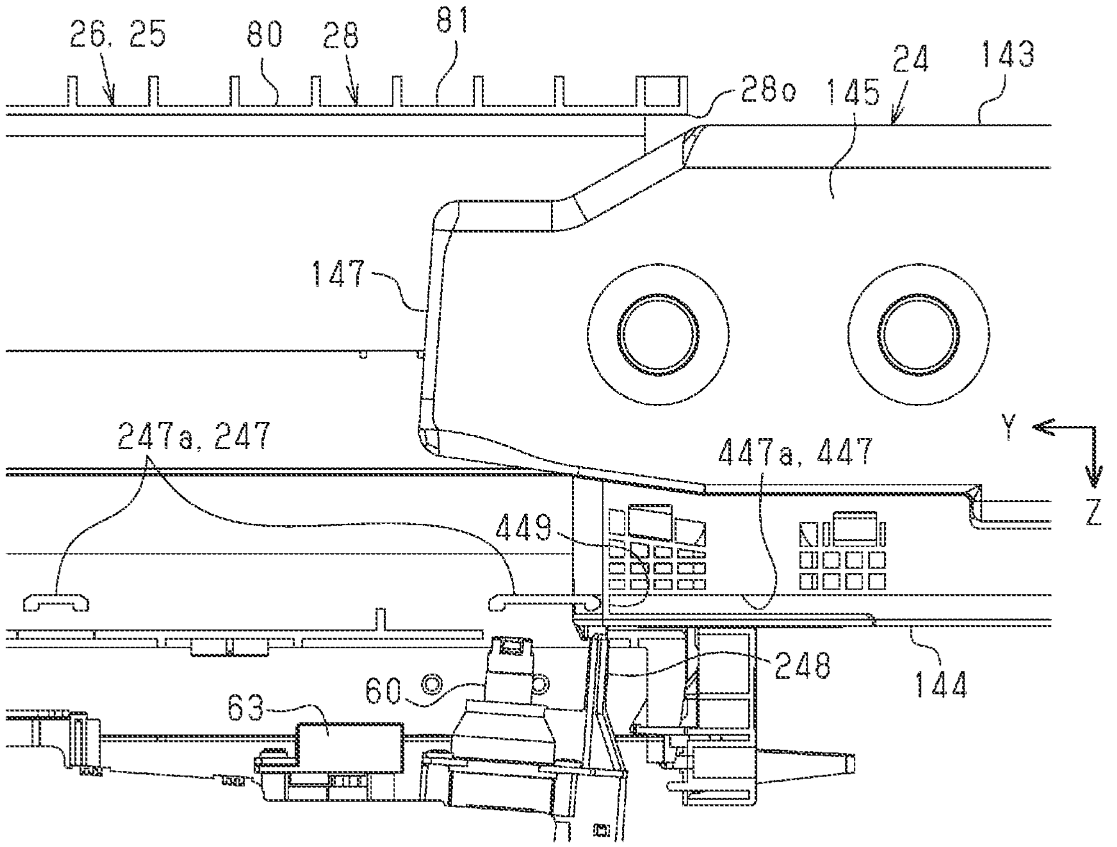
FIG. 20 is a partially-cut-away partial side view illustrating a liquid container attempted to be attached with wrong/reverse front-rear container orientation to an attachment portion of a tank unit according to a comparative example.
Figure 21:
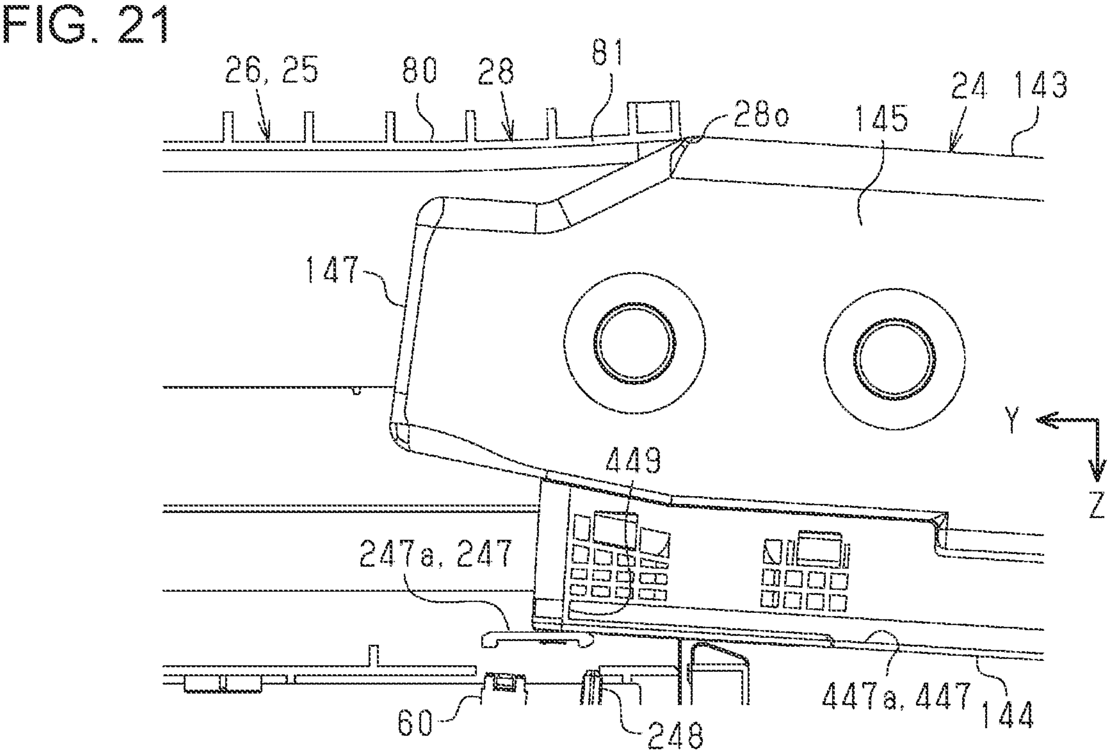
FIG. 21 is a partially-cut-away partial side view illustrating a deformed state of a top plate caused by pushing the liquid container by force into the attachment portion of the tank unit according to the comparative example with wrong/reverse front-rear container orientation.
Figure 22:
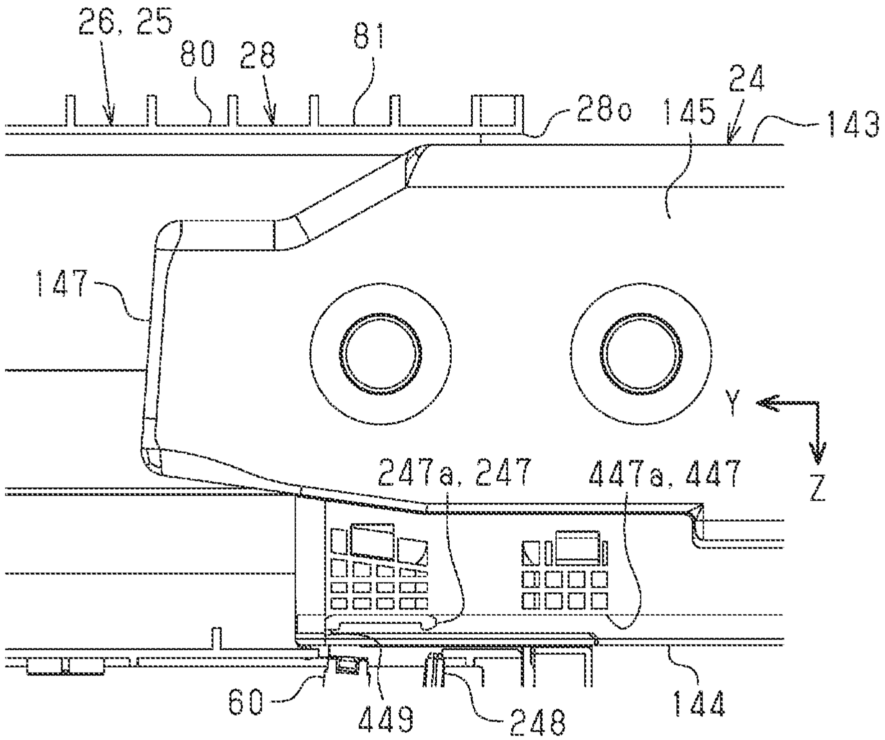
FIG. 22 is a partially-cut-away partial side view illustrating the liquid container having been attached with wrong/reverse front-rear container orientation to the attachment portion of the tank unit according to the comparative example, ending up in a deadlock.
Figure 23:
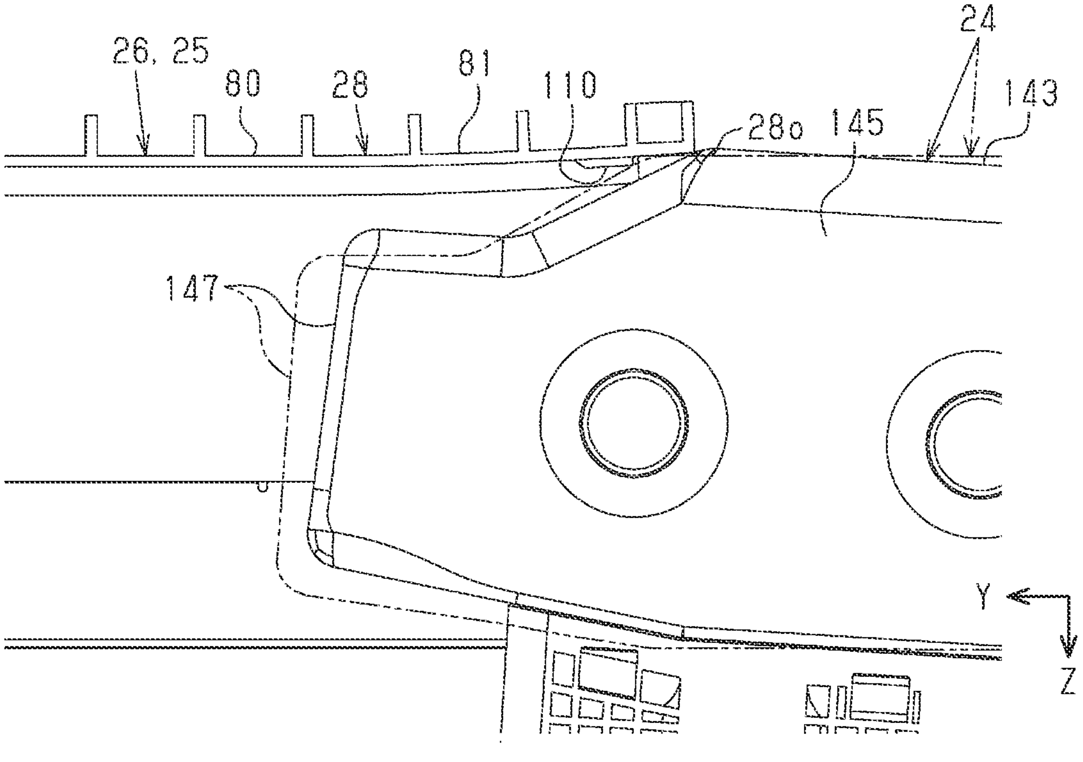
FIG. 23 is a partially-cut-away partial side view illustrating a process of attachment of a liquid container to the attachment portion of the tank unit according to an exemplary embodiment attempted to be attached with wrong/reverse front-rear container orientation.

Next, with reference to FIGS. 19 to 23, a problem that arises when the user attempts to attach the liquid container 24 with wrong front-rear container orientation, and a structure of the attachment portion 28 for solving the problem, will now be explained. FIG. 19 illustrates a state in which the user attaches the liquid container 24 with correct front-rear container orientation in the present embodiment. FIGS. 20 to 22 illustrate a structure of the attachment portion 28 according to related art for explaining a problem that arises when the user attempts to attach the liquid container 24 with wrong front-rear container orientation. FIG. 23 illustrates a structure of the attachment portion 28 according to the present embodiment.

As illustrated in FIG. 19, when the liquid container 24 is attached with correct front-rear container orientation, the liquid container 24 is inserted straight horizontally into the frame 80 like a box through the insertion opening 28*o*. The liquid container 24 is inserted straight along a top plate 81 constituting a part of the frame 80. In the process of insertion of the liquid container 24, the guiding portions 247 of the attachment portion 28 are brought into engagement with and into the guided portions 447 of the liquid container 24. More specifically, as the insertion of the liquid container 24 into the frame proceeds, first, the two guiding portions 247*a* are sequentially brought into engagement with and into the first guided portions 447*a*, and then, at the final stage of attachment before completion, the second guiding portions 247*b* are brought into engagement with and into the second guided portions 447*b*. A stopper 449 for not allowing the liquid container 24 to be inserted farther into the frame 80 beyond its position is provided on the rear end face of the first guided portion 447*a*.

Next, with reference to FIGS. 20 to 23, a problem that arises when the user attempts to attach the liquid container 24 with wrong front-rear container orientation will now be explained.

As illustrated in FIG. 20, in related art, even when the user attempts to attach the liquid container 24 with wrong front-rear container orientation, the first guiding portion 247*a* collides with the stopper 449, which is a rib located at the rear end of the first guided portion 447*a*. Therefore, it is designed that the liquid container 24 cannot be inserted farther with wrong front-rear container orientation.

However, despite this design, it could happen that the user attempts to push the liquid container 24 inward by force. In this case, if the user attempts to push the liquid container 24 inward while tilting the liquid container 24, as illustrated in FIG. 21, the rear end portion of the liquid container 24 passes over the first guiding portion 247*a* and pushes up the portion, of the top plate 81, near the insertion opening 28*o*. In this case, the upper surface of the rear end portion of the liquid container 24 causes the top plate 81 to be deformed near the insertion opening 28*o*, and the liquid container 24 is inserted to a predetermined position through the insertion opening 28*o*; therefore, there is a possibility that the liquid container 24 might become not detachable. Moreover, if the liquid container 24 is inserted deeper into the frame 80 beyond the position of the stopper 449, as illustrated in FIG. 22, it could happen that the guiding portion 247*a* is brought into engagement with and into the guided portion 447*a*. If this happens, the guiding portion 247*a*, once engaged with and into the guided portion 447*a*, cannot climb over the stopper 449, resulting in a deadlock state illustrated in FIG. 22, in which the liquid container 24 cannot be detached from the frame 80.

To avoid such a deadlock state, as illustrated in FIGS. 19 and 23, the attachment portion 28 according to the present embodiment has a protruding portion 110 on the lower surface of the top plate 81 of the frame 80 near the insertion opening 28*o*. Even when the top plate 81 deforms due to the user's attempt to insert the rear end portion of the liquid container 24 through the insertion opening 28*o* by force toward a space under the lower surface of the top plate 81 (in the vertical direction Z), the liquid container 24 cannot be inserted farther into the frame 80 because the top surface of the rear end portion of the liquid container 24 collides with the protruding portion 110. Therefore, it is possible to avoid the liquid container 24 from becoming deadlocked.

Operation of Embodiment

Next, operation of the present embodiment will now be explained.

The user attaches the liquid container 24 to the attachment portion 28 of the tank unit 26. Due to this attachment, the pouring outlet portion 30 of the liquid container 24 becomes connected to the first inlet portion 60 of the tank unit 26. Such attachment of the liquid container 24 is performed when, for example, the liquid container 24 having run out of the liquid is replaced with another one 24, for example, when the liquid in the tank unit 26 is detected as END, or when a state in which the first liquid surface 66 in the first chamber 62 is below the standard level position SH continues for longer than a predetermined period. In this case, the control portion 19 causes the display portion 15*a* to display a message, etc. that prompts the user to replace the liquid container 24 with another one. Prompted by the message, the user replaces this liquid container 24 with another one.

The first inlet portion 60 is in communication with the first chamber 62 via the opening portion 603, which is located at some midpoint in the vertical direction Z of the first chamber 62. Liquid is supplied from the liquid container 24 into the first chamber 62 while the first vapor-phase portion 62G and the inlet vapor-phase portion 60G are in communication with each other via the opening portion 603. Then, the first vapor-phase portion 62G and the inlet vapor-phase portion 60G become not in communication with each other when the first liquid surface 66 in the first chamber 62 reaches the standard level position SH (see FIG. 10), which is at some midpoint in the vertical direction Z of the first chamber 62. In other words, the first vapor-phase portion 62G and the inlet vapor-phase portion 60G become not in communication with each other due to the reaching of the first liquid surface 66 at the lower end 604 of the regulating portion 602. That is, the flow passage of air from the first vapor-phase portion 62G to the inlet vapor-phase portion 60G is disconnected. As a result, the supply of the liquid from the liquid container 24 to the first chamber 62 is stopped.

When the liquid is supplied from the second chamber 68 to the liquid ejecting head 23, and the second liquid surface 70 therefore becomes lower in level than the first liquid surface 66, the on-off valve 36 opens due to a hydraulic head difference between the first chamber 62 and the second chamber 68. As a result, the liquid flows from the first chamber 62 to the second chamber 68 through the outlet flow passage 34. When the liquid-level position of the first liquid surface 66 drops below the standard level position SH due to this flow, the first vapor-phase portion 62G and the inlet vapor-phase portion 60G come back into communication with each other to form an air flow passage again, and the supply of the liquid from the liquid container 24 to the first chamber 62 starts.

The first liquid surface 66 rises in level due to the supply of the liquid from the liquid container 24 to the first chamber 62, and the first liquid surface 66 becomes higher in level than the second liquid surface 70. When the liquid stored in the second chamber 68 is supplied to the liquid ejecting head 23 for liquid circulation, printing (liquid ejecting processing), and cleaning, the second liquid surface 70 drops in level, and the second liquid surface 70 becomes lower in level than the first liquid surface 66.

In these cases, the level of the first liquid surface 66 and the level of the second liquid surface 70 are adjusted to become equal to each other by the opening of the on-off valve 36. The on-off valve 36 closes when there is no longer a hydraulic head difference because the level of the first liquid surface 66 and the level of the second liquid surface 70 have become almost equal to each other. As described here, the liquid-level position of the first liquid surface 66 and the liquid-level position of the second liquid surface 70 are adjusted to the standard level position SH, meaning almost the same level (see FIGS. 2 and 10).

In this way, the first liquid surface 66 in the first chamber 62 is autonomously adjusted to the standard level position SH, which is a position where the first inlet portion 60 is connected to the first chamber 62 via the opening portion 603 at the lower end of the inlet passage 601, and which is at some midpoint in the vertical direction Z of the first chamber 62. That is, the first liquid surface 66 is autonomously adjusted to the standard level position SH, which is at the level of the lower end 604 of the regulating portion 602 serving as a partition between the inlet passage 601 and the first chamber 62.

As illustrated in FIGS. 16 and 17, the valve body 101 of the on-off valve 36 has the annular rip portion 105, which is provided on the thick valve plate portion 103*a*, and the annular flange portion 106. Given the same reservoir pressurizing force of the second chamber 68, therefore, the valve body 101 of the on-off valve 36 makes it possible to obtain seal pressure that is approximately twice as high as that of an umbrella valve according to related art (see FIG. 18). Therefore, it is possible to suppress minute leakage at the on-off valve 36.

For example, when the first liquid surface 66 rises in level beyond the full level position due to inclination of the liquid ejecting apparatus 11 or for any other reason, there is a risk that the leakage of the liquid through the nozzles 22 of the liquid ejecting head 23 might occur due to a hydraulic head difference. However, in the present embodiment, when it is detected by the liquid surface detecting portion 63 that the liquid surface is at the full level position, or when the tilt of the tank unit 26 exceeding the angular threshold is detected by the tilt detecting portion 98, the control portion 19 prohibits the liquid ejecting apparatus 11 from starting printing. Then, the control portion 19 causes the display portion 15*a* to display a message that prompts the user to eliminate the tilt of the liquid ejecting apparatus 11. Prompted by the message, the user eliminates the tilt of the liquid ejecting apparatus 11. When the detection result of the tilt detecting portion 98 becomes less than the angular threshold as a result of the tilt elimination, the control portion 19 causes printing to be started.

The liquid ejecting apparatus 11 causes the liquid to circulate when in a standby state, in which printing is not performed. The liquid circulates by flowing through the second chamber 68 of the tank unit 26, the supply flow passage 37, the liquid ejecting head 23, and the collection flow passage 39 and then returning to the first chamber 62 of the tank unit 26. The supply valve 38 and the circulation valve 40 are open at this time. The second chamber 68 is pressurized in a state in which the first chamber 62 is opened to atmosphere via the first opening-to-atmosphere portion 64.

As illustrated in FIG. 10, in the tank unit 26, the liquid supplied from the second chamber 68 through the outlet portion 74 and the supply flow passage 37 in an OUT direction indicated by the solid-line arrow in FIG. 10 flows through the inside of the liquid ejecting head 23 (see FIG. 2) and thereafter flows from the liquid ejecting head 23 through the collection flow passage 39 to return to the first chamber 62 via the second inlet portion 75. The pressure of the second chamber 68 is higher than the pressure of the first chamber 62 at this time. Therefore, the on-off valve 36 closes. That is, the liquid ejecting apparatus 11 applies pressure to the inside of the second chamber 68 to close the on-off valve 36, thereby closing the outlet flow passage 34.

When this liquid circulation is performed, the liquid returning from the liquid ejecting head 23 to the first chamber 62 of the tank unit 26 flows into the first chamber 62 via the communication opening 75*a*. It could happen that the liquid gushes out into the first chamber 62 from the communication opening 75*a* at this time. However, in the present embodiment, the eave-like cover portion 88 is provided at a position where it faces the communication opening 75*a* inside the first chamber 62. Therefore, the liquid gushing out with great energy from the communication opening 75*a* hits against the cover portion 88, and its energy is therefore abated. Consequently, it is possible to reduce the possibility that the liquid gushing out from the communication opening 75*a* reaches an area where the liquid is not supposed to flow in, for example, the opening-to-atmosphere port 33*a*.

The liquid that circulates flows through the filter 100 in the process of being supplied from the second chamber 68 toward the liquid ejecting head 23. The filter 100 traps foreign objects such as air bubbles or fine dust particles contained in the liquid that circulates. Therefore, when the liquid ejecting apparatus 11 performs printing, the liquid after the removal of the foreign objects such as air bubbles are supplied to the liquid ejecting head 23.

At least one of the supply valve 38 or the circulation valve 40 is opened during printing. The number of valves that are opened, of the supply valve 38 and the circulation valve 40, may be determined depending on an amount of liquid ejected from the nozzles 22 of the liquid ejecting head 23. For example, based on print data, when an ejection amount is not greater than a predetermined value, the control portion 19 may cause the supply valve 38 only to be opened. For example, based on print data, when an ejection amount is greater than a predetermined value, the control portion 19 may cause both the supply valve 38 and the circulation valve 40 to be opened.

When printing is performed, the switching mechanism 48 opens the sixth selection valve 73*f* and the tenth selection valve 73*j* to communicate the inside of the first chamber 62 with atmosphere through the opening-to-atmosphere path 50 and the connection flow passage 52. In addition, the switching mechanism 48 opens the seventh selection valve 73*g* and the eleventh selection valve 73*k* to communicate the inside of the second chamber 68 with atmosphere through the pressurizing flow passage 51 and the connection flow passage 52.

When printing is performed, based on a hydraulic head difference between the second liquid surface 70 inside the second chamber 68 and the nozzles 22, and based on a hydraulic head difference between the first liquid surface 66 inside the first chamber 62 and the nozzles 22, negative pressure acts on the liquid present inside the liquid ejecting head 23. When printing is performed, the liquid stored in the second chamber 68 is supplied to the liquid ejecting head 23 through the supply flow passage 37, and the liquid stored in the first chamber 62 is supplied to the liquid ejecting head 23 through the collection flow passage 39 in an OUT direction indicated by the broken-line arrow in FIG. 10.

The liquid ejecting apparatus 11 performs pressurization cleaning of the liquid ejecting head 23 periodically or non-periodically. In pressurization cleaning, pressure is applied to the liquid stored in the second chamber 68 to pressurize the liquid present inside the liquid ejecting head 23, thereby forcibly ejecting the liquid from the nozzles 22. In this process, the second chamber 68 is pressurized in a state in which the supply valve 38 is open and the circulation valve 40 is closed. By the driving of the pressurizing portion 47 in the forward direction, air having flowed through the connection flow passage 52 and the pressurizing flow passage 51 enters the second chamber 68 via the opening-to-atmosphere portion 69. As a result, the inside of the second chamber 68 is pressurized.

The liquid present inside the liquid ejecting head 23 is pressurized due to the pressurization of the liquid stored in the second chamber 68 in a state in which the circulation valve 40 is open. Pressurization cleaning for forcibly ejecting the liquid from the nozzles 22 of the liquid ejecting head 23 is performed in this way. The on-off valve 36 is closed due to the pressurization force of the second chamber 68 at this time. The liquid is ejected from the nozzles 22 by this pressurization cleaning into a non-illustrated cap or a non-illustrated flushing box. The liquid is collected from the cap or the flushing box to a non-illustrated waste liquid collection portion.

Effects of Embodiment

Effects of the present embodiment will now be explained.

(1) The tank unit 26 is configured such that liquid supplied from the liquid container 24 flows into it and the liquid flows out of it toward the liquid ejecting head 23 configured to eject the liquid. The tank unit 26 includes the first inlet portion 60 via which the liquid supplied from the liquid container 24 flows in; the first chamber 62 configured to store the liquid that flows in via the first inlet portion 60; and the first opening-to-atmosphere portion 64 configured to open an inside of the first chamber 62 to atmosphere. The tank unit 26 further includes the outlet flow passage 34 to which one end is connected to the first chamber 62 and through which the liquid stored in the first chamber 62 flows out; the second chamber 68 connected to the other end of the outlet flow passage 34 and configured to store the liquid supplied from the first chamber 62; and the second opening-to-atmosphere portion 69 configured to open an inside of the second chamber 68 to atmosphere. The tank unit 26 further includes the on-off valve 36 configured to open and close the outlet flow passage 34. The first inlet portion 60 is connected to the first chamber 62 via the opening portion 603 at some midpoint in the vertical direction Z of the first chamber 62. With this structure, it is possible to adjust the liquid surface of the two reservoir chambers 62 and 68 into an appropriate level without any need for performing supply control, etc.

(2) In the tank unit 26, the opening portion 603 is located below the center inside the first chamber 62 in the vertical direction Z. With this structure, when there is liquid movement between the first chamber 62, the second chamber 68, and the liquid container 24 due to an ambient change, etc., it is possible to prevent an overflow of the liquid from the reservoir chamber, etc.

(3) The tank unit 26 further includes the liquid surface detecting portion 63 configured to detect the surface level of the liquid stored in the first chamber 62. With this structure, it is possible to detect that the liquid left in the liquid container 24 has become small, and it is possible to prevent the overflow of the liquid stored in the first chamber 62.

(4) In the tank unit 26, the on-off valve 36 includes a one-way valve that tolerates flow of the liquid from the first chamber 62 toward the second chamber 68 and does not tolerate flow of the liquid from the second chamber 68 toward the first chamber 62. This structure makes a valve driver unnecessary.

(5) In the tank unit 26, when viewed in the vertical direction Z, the first chamber 62 and the second chamber 68 overlap at least partially. This structure realizes an efficient layout of the first chamber 62 and the second chamber 68.

(6) The tank unit 26 further includes the outlet portion 74 that is in communication with the second chamber 68, the liquid stored in the second chamber 68 being configured to flow out via the outlet portion 74 toward the liquid ejecting head 23; and the second inlet portion 75 that is in communication with the first chamber 62, the liquid collected from the liquid ejecting head 23 being configured to flow in via the second inlet portion 75. This structure makes it possible to keep the liquid surface of the first chamber 62 and the liquid surface of the second chamber 68 at the same surface level.

(7) The tank unit 26 further includes the filter 100 provided between the second chamber 68 and the outlet portion 74 and configured to trap foreign objects contained in the liquid. This structure makes it possible to trap foreign objects mixed in the process of replacement of the liquid container 24, foreign objects mixed in the process of circulation, and the like.

(8) In the tank unit 26, the first chamber 62 has the cover portion 88 inside; and the cover portion 88 is provided over the second inlet portion 75 formed in a lower surface inside the first chamber 62. This structure makes it possible to prevent ink collected into the first chamber 62 from being scattered in the first chamber 62 all around.

(9) The liquid ejecting apparatus includes the liquid ejecting head 23 configured to eject liquid; the tank unit 26; the supply flow passage 37 that provides communication between the outlet portion 74 and the liquid ejecting head 23; and the collection flow passage 39 that provides communication between the liquid ejecting head 23 and second inlet portion 75. The same effects as those of the tank unit 26 can be obtained from the liquid ejecting apparatus 11 having this structure.

(10) The liquid ejecting apparatus 11 further includes the tilt detecting portion 98 that detects a tilt of the tank unit 26. This structure makes it possible to reduce an amount of change in the liquid surface due to a tilt. Therefore, it is possible to reduce variation in liquid surface detection.

(11) The liquid ejecting apparatus 11 further includes the pressurizing portion 47 that is in communication with the second opening-to-atmosphere portion 69 and is configured to apply pressure to the inside of the second chamber 68. This structure makes it possible to perform pressurization cleaning.

The present embodiment may be modified as described below. The present embodiment and the following modification examples may be combined with one another as long as they are not technically contradictory to one another.

The first inlet portion 60 may have a conduit such as a pipe, a hose, a tube, etc. extending in such a way as to have a directional component in the vertical direction Z inside the first chamber 62.

The opening plane of the opening portion 603 may be a horizontal plane. The opening plane of the opening portion 603 may be inclined in a direction that is the opposite of the direction illustrated in FIG. 10. The angle of the opening plane of the opening portion 603 with respect to the horizontal plane may be changed as may be necessary. It is sufficient as long as the opening portion 603 is oriented downward. That is, it is sufficient as long as the direction of a line normal to the opening plane of the opening portion 603 is either the vertical direction Z or any direction between the vertical direction Z and the horizontal direction.

The first inlet portion 60 may extend in the vertical direction Z without any inclination.

The inlet passage 601 of the first inlet portion 60 may be a curved flow passage. It is sufficient as long as the first inlet portion 60 is connected via the opening portion 603 at some midpoint in the vertical direction Z of the first chamber 62. As long as this is met, the flow-passage shape of the inlet passage 601 from the inlet 60*a* of the first inlet portion 60 to the opening portion 603 may be any shape. That is, it is sufficient as long as the lower end of the regulating portion 602 serving as a partition between the first chamber 62 and the inlet passage 601 is at some midpoint in the vertical direction Z of the first chamber 62. The opening plane of the opening portion 603 as viewed in the direction along the Y axis may be inclined with respect to the horizontal plane. In this case, the level of the first liquid surface 66 is defined by the highest part of the opening plane of the opening portion 603 as viewed in the direction along the Y axis.

The on-off valve 36 may be controlled by the control portion 19. The on-off valve 36 may be, for example, an electromagnetic valve. The on-off valve 36 may be a flow regulating valve whose flow at the time of opening can be regulated.

The pressurizing portion 47 is not limited to a tube pump. It may be any other kind of pump. For example, it may be a diaphragm pump, a gear pump, or the like.

The tank unit 26 is not limited to an internal tank unit disposed inside the body of the liquid ejecting apparatus 11. The tank unit 26 may be an external tank unit connected to the body through a tube or the like.

The liquid container 24 is not limited to a cartridge such as an ink cartridge. The liquid container 24 may be a tank configured to be detachably attached to the attachment portion 28.

The first reservoir portion 33 or the second reservoir portion 35 may have a window portion through which the user is able to visually confirm the amount of liquid.

In the embodiment, the on-off valve 36 may be omitted. For example, both of the first chamber 62 and the second chamber 68 may be pressurized when cleaning is performed. Such a technical concept is also encompassed within the scope of the embodiment. Even when modified as in such a technical concept, it is possible to provide the tank unit 26 and the liquid ejecting apparatus 11 capable of adjusting the liquid surface of the two reservoir chambers 62 and 68 into an appropriate level with a simple structure.

The second inlet portion 75 may be provided on the second reservoir portion 35, and the liquid coming from the liquid ejecting head 23 may return to the second chamber 68 through the collection flow passage 39 when the liquid is circulated.

The liquid ejecting apparatus may be an ink-jet textile printing apparatus. The textile printing apparatus may include the tank unit 26.

The cleaning may be suction cleaning, instead of pressurization cleaning. In the suction cleaning, a cap is brought in contact with the periphery of the nozzle surface 21 of the liquid ejecting head 23 in such a way as to enclose all of the nozzles 22. Liquid is forcibly discharged through the nozzles by making the pressure of the closed space enclosed by the cap and the nozzle surface 21 negative by driving a suction pump.

The liquid ejecting apparatus 11 may be configured to eject any other kind of liquid, instead of ink. The state of liquid ejected in the form of a micro droplet from the liquid ejecting apparatus encompasses a particulate droplet, a tear-shaped droplet, and a droplet that forms a thready tail. “Liquid” mentioned herein may be made of any material that can be ejected from the liquid ejecting apparatus. For example, “liquid” may be any matter that is in a liquid phase, including but not limited to: a matter that is in a state of liquid having high viscosity or low viscosity, fluid such as sol or gel water, other inorganic solvent or organic solvent, solution, liquid resin, liquid metal, metal melt, etc. “Liquid” encompasses not only liquid as a state of matter but also liquid made as a result of dissolution, dispersion, or mixture of particles of a functional material made of a solid such as pigment or metal particles, etc. into/with a solvent. Ink described in the foregoing embodiment, pretreatment liquid, and post-treatment liquid, etc. are typical examples of “liquid”.

Technical concepts derivable from the foregoing embodiment and from its modification examples, and the operational effects thereof, will be described below.

(A) A tank unit is configured such that liquid supplied from a liquid container flows into it and the liquid flows out of it toward a liquid ejecting head configured to eject the liquid. The tank unit includes: a first inlet portion via which the liquid supplied from the liquid container flows in; a first chamber configured to store the liquid that flows in via the first inlet portion; a first opening-to-atmosphere portion configured to open an inside of the first chamber to atmosphere; an outlet flow passage to which one end is connected to the first chamber; a second chamber connected to the other end of the outlet flow passage and configured to store the liquid supplied from the first chamber; a second opening-to-atmosphere portion configured to open an inside of the second chamber to atmosphere; and an on-off valve configured to open and close the outlet flow passage, wherein the first inlet portion is connected to the first chamber via an opening portion at some midpoint in a vertical direction of the first chamber.

With this structure, it is possible to adjust the liquid surface of the two reservoir chambers into an appropriate level without any need for performing supply control, etc.

(B) In the above tank unit, the opening portion may be located below the center inside the first chamber in the vertical direction.

With this structure, when there is liquid movement between the first chamber, the second chamber, and the liquid container due to an ambient change, etc., it is possible to prevent an overflow of the liquid from the reservoir chamber, etc.

(C) The above tank unit may further include a liquid surface detecting portion configured to detect a surface level of the liquid stored in the first chamber.

With this structure, it is possible to detect that the liquid left in the liquid container has become small, and it is possible to prevent the overflow of the liquid stored in the first chamber.

(D) In the above tank unit, the on-off valve includes a one-way valve that tolerates flow of the liquid from the first chamber toward the second chamber and does not tolerate flow of the liquid from the second chamber toward the first chamber.

This structure makes a valve driver unnecessary.

(E) In the above tank unit, when viewed in the vertical direction, the first chamber and the second chamber may overlap at least partially.

This structure realizes an efficient layout of the first chamber and the second chamber.

(F) The above tank unit may further include: an outlet portion that is in communication with the second chamber, the liquid stored in the second chamber being configured to flow out via the outlet portion toward the liquid ejecting head; and a second inlet portion that is in communication with the first chamber, the liquid collected from the liquid ejecting head being configured to flow in via the second inlet portion.

This structure makes it possible to keep the liquid surface of the first chamber and the liquid surface of the second chamber at the same surface level.

(G) The above tank unit may further include: a filter provided between the second chamber and the outlet portion and configured to trap foreign objects contained in the liquid.

This structure makes it possible to trap foreign objects mixed in the process of replacement of the liquid container, foreign objects mixed in the process of circulation, and the like.

(H) In the above tank unit, the first chamber may have a cover portion inside; and the cover portion may be provided over the second inlet portion formed in a lower surface inside the first chamber.

This structure makes it possible to prevent ink collected into the first chamber from being scattered in the first chamber all around.

(I) A liquid ejecting apparatus includes: a liquid ejecting head configured to eject liquid; the above tank unit; a supply flow passage that provides communication between the outlet portion and the liquid ejecting head; and a collection flow passage that provides communication between the liquid ejecting head and second inlet portion.

The same effects as those of the above tank unit can be obtained from the liquid ejecting apparatus having this structure.

(J) The above liquid ejecting apparatus may further include: a tilt detecting portion that detects a tilt of the tank unit.

This structure makes it possible to reduce an amount of change in the liquid surface due to a tilt. Therefore, it is possible to reduce variation in liquid surface detection.

(K) The above liquid ejecting apparatus may further include: a pressurizing portion that is in communication with the second opening-to-atmosphere portion and is configured to apply pressure to an inside of the second chamber.

This structure makes it possible to perform pressurization cleaning.

What is claimed is:

1. A tank unit into which liquid supplied from a liquid container is configured to flow and out of which the liquid is configured to flow toward a liquid ejecting head configured to eject the liquid, the tank unit comprising:

a first inlet portion via which the liquid supplied from the liquid container flows in;

a first chamber configured to store the liquid that flows in via the first inlet portion;

a first opening-to-atmosphere portion configured to open an inside of the first chamber to atmosphere;

an outlet flow passage to which one end is connected to the first chamber;

a second chamber connected to an other end of the outlet flow passage and configured to store the liquid supplied from the first chamber;

a second opening-to-atmosphere portion configured to open an inside of the second chamber to atmosphere; and an on-off valve configured to open and close the outlet flow passage, wherein the first inlet portion is connected to the first chamber via an opening portion at some midpoint in a vertical direction of the first chamber, and the first chamber and the second chamber are aligned in a horizontal direction.

2. The tank unit according to claim 1, wherein the opening portion is located below a center inside the first chamber in the vertical direction.

3. The tank unit according to claim 1, further comprising:

a liquid surface detecting portion configured to detect a surface level of the liquid stored in the first chamber.

4. The tank unit according to claim 1, wherein the on-off valve includes a one-way valve that tolerates flow of the liquid from the first chamber toward the second chamber and does not tolerate flow of the liquid from the second chamber toward the first chamber.

5. The tank unit according to claim 1, wherein when viewed in the vertical direction, the first chamber and the second chamber overlap at least partially.

6. The tank unit according to claim 1, further comprising:

an outlet portion that is in communication with the second chamber, the liquid stored in the second chamber being configured to flow out via the outlet portion toward the liquid ejecting head; and a second inlet portion that is in communication with the first chamber, the liquid collected from the liquid ejecting head being configured to flow in via the second inlet portion.

7. The tank unit according to claim 6, further comprising:

a filter provided between the second chamber and the outlet portion and configured to trap foreign objects contained in the liquid.

8. The tank unit according to claim 6, wherein the first chamber has a cover portion inside; and the cover portion is provided over the second inlet portion formed in a lower surface inside the first chamber.

9. A liquid ejecting apparatus, comprising:

a liquid ejecting head configured to eject liquid;

the tank unit according to claim 6;

a supply flow passage that provides communication between the outlet portion and the liquid ejecting head; and a collection flow passage that provides communication between the liquid ejecting head and second inlet portion.

10. The liquid ejecting apparatus according to claim 9, further comprising:

a tilt detecting portion that detects a tilt of the tank unit.

11. The liquid ejecting apparatus according to claim 9, further comprising:

a pressurizing portion that is in communication with the second opening-to-atmosphere portion and is configured to apply pressure to an inside of the second chamber.

12. The tank unit according to claim 1, wherein the first chamber has an overhang portion protruding in a horizontal direction, and the second chamber has an underlying portion protruding in the horizontal direction, and when viewed in the vertical direction, the first chamber and the second chamber are arranged such that the overhang portion and the underlying portion at least partially overlap.

13. The tank unit according to claim 1, wherein the first inlet portion has a regulating portion regulating the liquid-level position of the first liquid surface.

14. The tank unit according to claim 13, wherein the regulating portion is a partition plate.

* * * * *